United States Patent
Lee et al.

(10) Patent No.: US 12,358,938 B2
(45) Date of Patent: *Jul. 15, 2025

(54) TRANSITION METAL COMPOUND AND METHOD OF PREPARING POLYPROPYLENE USING THE SAME

(71) Applicant: LG Chem, Ltd., Seoul (KR)

(72) Inventors: Insun Lee, Daejeon (KR); Seok Hwan Kim, Daejeon (KR); Byung Seok Kim, Daejeon (KR); Donghyeon Gwon, Daejeon (KR); Seyoung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1018 days.

This patent is subject to a terminal disclaimer.

(21) Appl. No.: 17/264,593

(22) PCT Filed: Jun. 10, 2020

(86) PCT No.: PCT/KR2020/007486
§ 371 (c)(1),
(2) Date: Jan. 29, 2021

(87) PCT Pub. No.: WO2020/251247
PCT Pub. Date: Dec. 17, 2020

(65) Prior Publication Data
US 2021/0332075 A1 Oct. 28, 2021

(30) Foreign Application Priority Data

Jun. 13, 2019 (KR) .......... 10-2019-0069973
Jun. 9, 2020 (KR) .......... 10-2020-0069691

(51) Int. Cl.
| C07F 17/00 | (2006.01) |
| B01J 31/22 | (2006.01) |
| C08F 4/16 | (2006.01) |
| C08F 4/659 | (2006.01) |
| C08F 4/6592 | (2006.01) |
| C08F 110/06 | (2006.01) |

(52) U.S. Cl.
CPC .............. *C07F 17/00* (2013.01); *B01J 31/22* (2013.01); *C08F 4/16* (2013.01); *C08F 110/06* (2013.01)

(58) Field of Classification Search
CPC .......... C07F 17/00; C08F 4/16; C08F 4/6496; C08F 4/65927
See application file for complete search history.

(56) References Cited

U.S. PATENT DOCUMENTS

| 6,117,962 A | 9/2000 | Weng et al. |
| 6,469,114 B1 | 10/2002 | Schottek et al. |
| 7,109,278 B2* | 9/2006 | Okumura ................ C07F 17/00 502/103 |
| 2006/0100401 A1 | 5/2006 | Martin et al. |
| 2006/0235171 A1 | 10/2006 | Lee et al. |
| 2007/0155919 A1 | 7/2007 | Okumura et al. |
| 2007/0260025 A1 | 11/2007 | Elder et al. |
| 2010/0106513 A1 | 4/2010 | Dillon et al. |
| 2010/0292421 A1 | 11/2010 | Bando |
| 2014/0114031 A1 | 4/2014 | Bando et al. |

(Continued)

FOREIGN PATENT DOCUMENTS

| CN | 1274367 A | 11/2000 |
| CN | 1697843 A | 11/2005 |

(Continued)

OTHER PUBLICATIONS

Extended European Search Report including Written Opinion for Application No. 20822420.4 dated Oct. 25, 2022, pp. 1-12.

(Continued)

*Primary Examiner* — Alexander R Pagano
*Assistant Examiner* — Frank S. Hou
(74) *Attorney, Agent, or Firm* — Lerner David LLP

(57) ABSTRACT

Provided are a novel transition metal compound of the following Chemical Formula 1 that exhibits excellent catalytic activity, allows formation of a macromonomer which is a polymer in which a double bond is formed at the end of a chain, and improves a melt strength characteristic when used in polymerizing polypropylene, and a method of preparing a polypropylene using the same.

[Chemical Formula 1]

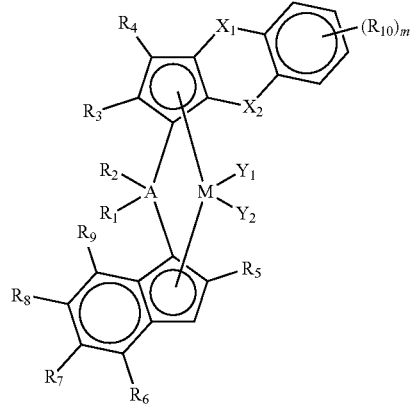

wherein A, M, $R_1$ to $R_{10}$, $X_1$ and $X_2$, $Y_1$ and $Y_2$ and m are described herein.

14 Claims, No Drawings

(56) References Cited

U.S. PATENT DOCUMENTS

| | | |
|---|---|---|
| 2015/0031844 A1 | 1/2015 | Lee et al. |
| 2015/0239916 A1 | 8/2015 | Do et al. |
| 2016/0237187 A1 | 8/2016 | Hong et al. |
| 2016/0304639 A1 | 10/2016 | Bader et al. |
| 2018/0134816 A1 | 5/2018 | Canich et al. |
| 2018/0273669 A1 | 9/2018 | Arai |
| 2018/0346618 A1 | 12/2018 | Bader et al. |
| 2018/0371116 A1 | 12/2018 | Kim et al. |
| 2019/0106516 A1 | 4/2019 | Park et al. |
| 2019/0135961 A1* | 5/2019 | Joung .................. C08F 2/00 |
| 2019/0263942 A1 | 8/2019 | Jeong et al. |
| 2020/0140583 A1 | 5/2020 | Kim et al. |
| 2021/0332075 A1 | 10/2021 | Lee et al. |
| 2022/0144983 A1* | 5/2022 | An .................... C08F 110/06 |

FOREIGN PATENT DOCUMENTS

| | | | |
|---|---|---|---|
| CN | 1890272 A | | 1/2007 |
| CN | 101868471 A | | 10/2010 |
| CN | 104797586 A | | 7/2015 |
| CN | 105985372 A | * | 10/2016 |
| CN | 106488923 A | | 3/2017 |
| CN | 107108674 A | | 8/2017 |
| CN | 109071699 A | | 12/2018 |
| CN | 109369837 A | | 2/2019 |
| CN | 109415450 A | | 3/2019 |
| EP | 3925987 A1 | | 12/2021 |
| JP | H11130807 A | | 5/1999 |
| JP | 2002535416 A | | 10/2002 |
| JP | 2007511475 A | | 5/2007 |
| JP | 2010242015 A | | 10/2010 |
| JP | 2011236375 A | | 11/2011 |
| JP | 2013100558 A | | 5/2013 |
| JP | 2019059933 A | | 4/2019 |
| KR | 20010031058 A | | 4/2001 |
| KR | 100579843 B1 | | 5/2006 |
| KR | 20060123293 A | | 12/2006 |
| KR | 20100076056 A | | 7/2010 |
| KR | 101139268 B1 | | 7/2012 |
| KR | 20160009264 | * | 1/2016 |
| KR | 20160009264 A | | 1/2016 |
| KR | 20160009265 A | | 1/2016 |
| KR | 20160097254 A | | 8/2016 |
| KR | 20170073463 A | | 6/2017 |
| KR | 20170075533 A | | 7/2017 |
| KR | 101773722 B1 | | 8/2017 |
| KR | 20180051222 A | | 5/2018 |
| KR | 20180067939 A | | 6/2018 |
| KR | 20190062163 A | | 6/2019 |
| KR | 20200093356 A | | 8/2020 |
| KR | 20200143272 A | | 12/2020 |
| KR | 20210020831 A | | 2/2021 |
| WO | 9929743 A1 | | 6/1999 |
| WO | 2017056946 A1 | | 4/2017 |
| WO | 2018110915 A1 | | 6/2018 |

OTHER PUBLICATIONS

Search report from International Application No. PCT/KR2020/007486, mailed Sep. 28, 2020.

Partial Supplementary European Search Report for Application No. 20822420.4 dated Aug. 2, 2022. 12 pgs.

Search Report from International Application No. PCT/KR2020/007548, mailed Sep. 23, 2020. 3 pgs.

Busico V and Cipullo R., Microstructure of Polypropylene. Progress in Polymer Science 26. (2001). 91 pgs.

Extended European Search Report including Written Opinion for Application No. 20822860.1 dated Mar. 30, 2022, pp. 1-9.

* cited by examiner

TRANSITION METAL COMPOUND AND METHOD OF PREPARING POLYPROPYLENE USING THE SAME

CROSS-REFERENCE TO RELATED APPLICATION(S)

This application is a national phase entry under 35 U.S.C. § 371 of International Application No. PCT/KR2020/007486 filed Jun. 10, 2020, which claims priority from Korean Patent Application No. 10-2019-0069973 filed Jun. 13, 2019, and Korean Patent Application No. 10-2020-0069691 filed Jun. 9, 2020, all of which are incorporated herein by reference.

TECHNICAL FIELD

The present invention relates to a novel transition metal compound that exhibits excellent catalytic activity, allows macromonomer formation, and improves a melt strength characteristic when used in polymerizing polypropylene, and a method of preparing a polypropylene using the same.

BACKGROUND ART

Olefin polymerization catalyst systems may be classified into Ziegler-Natta and metallocene catalyst systems, and these two highly active catalyst systems have been developed in compliance with their characteristics. A Ziegler-Natta catalyst has been widely applied to existing commercial processes. However, since the Ziegler-Natta catalyst is a multi-site catalyst in which a plurality of active sites are mixed, it has a feature that a polymer prepared by using the same has a broad molecular weight distribution. Also, since a compositional distribution of comonomers is not uniform, there is a problem in that it is difficult to obtain desired physical properties.

Meanwhile, the metallocene catalyst includes a combination of a main catalyst having a transition metal compound as a main component and an organometallic compound cocatalyst having aluminum as a main component, and is a homogeneous complex catalyst, and is also a single-site catalyst. Therefore, a polymer prepared by using the metallocene catalyst has a narrow molecular weight distribution and a uniform compositional distribution of comonomers. In addition, stereoregularity, copolymerization characteristics, molecular weight, crystallinity, etc. of the resulting polymer may be controlled by changing a ligand structure of the metallocene catalyst and polymerization conditions.

Meanwhile, polypropylene has been used as a general-purpose resin in various fields due to its low specific gravity, high heat resistance, and excellent processability and chemical resistance. However, polypropylene has a problem of poor melt strength.

In order to solve this problem, a method of introducing a long chain branch (LCB) into polypropylene has been studied in various ways, and in the catalyst field, research has been conducted to develop a catalyst for generating macromonomers. Macromonomer refers to a polymer in which a functional group containing a double bond is formed at the end of a chain. The functional group containing the double bond includes vinyl or vinylidene, and among them, only the vinyl end group may exhibit activity. Accordingly, as the content of the vinyl end group in polypropylene to be prepared is higher, it may be more advantageous in producing LCB.

However, a catalyst that is advantageous in producing such macromonomers, in particular, a catalyst capable of increasing the content of the vinyl end group in polypropylene to be prepared has not yet been developed.

DETAILED DESCRIPTION OF THE INVENTION

Technical Problem

Accordingly, an object of the present invention is to provide a novel transition metal compound that exhibits excellent catalytic activity, allows formation of a macromonomer which is a polymer in which a double bond is formed at the end of a chain, and may improve a melt strength characteristic when used in polymerization of polypropylene.

Further, another object of the present invention is to provide a method of preparing a homopolypropylene using the novel transition metal compound, and a homopolypropylene which is prepared thereby to have a high ratio of vinyl end groups and a low ratio of vinylidene end groups, and may exhibit an excellent melt strength characteristic.

Technical Solution

According to one embodiment of the present invention, there is provided a transition metal compound represented by the following Chemical Formula 1:

[Chemical Formula 1]

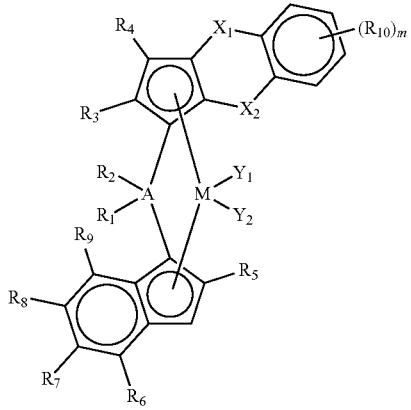

in Chemical Formula 1,
A is an element of Group 14;
M is a transition metal of Group 4,
$R_1$ to $R_5$ are each independently $C_{1-20}$ alkyl,
$R_6$ is $C_{6-20}$ aryl unsubstituted or substituted with $C_{1-20}$ alkyl,
$R_7$ to $R_9$ are each independently hydrogen, $C_{1-20}$ alkyl, $C_{2-20}$ alkenyl, $C_{6-30}$ aryl, $C_{7-30}$ alkylaryl, or $C_{7-30}$ arylalkyl, or two adjacent groups of $R_7$ to $R_9$ combine with each other to form an alicyclic ring,
$R_{10}$ is each independently hydrogen, $C_{1-20}$ alkyl, $C_{2-20}$ alkenyl, $C_{6-30}$ aryl, $C_{7-30}$ alkylaryl, or $C_{7-30}$ arylalkyl,
$X_1$ and $X_2$ are each independently a single bond, S, or $CR_aR_b$, wherein at least one of $X_1$ and $X_2$ is S, and $R_a$ and $R_b$ are each independently hydrogen, $C_{1-20}$ alkyl, $C_{2-20}$ alkenyl, $C_{6-30}$ aryl, $C_{7-30}$ alkylaryl, or $C_{7-30}$ arylalkyl, $Y_1$ and $Y_2$ are each independently halogen, and m is an integer of 1 to 4.

Further, according to another embodiment of the present invention, there is provided a catalyst composition including the transition metal compound.

According to still another embodiment of the present invention, there is provided a method of preparing a homopolypropylene, the method including the step of polymerizing propylene monomers by introducing hydrogen in the presence of the catalyst composition.

Furthermore, according to still another embodiment of the present invention, there is provided a homopolypropylene prepared by the above preparation method, wherein a ratio of vinyl end groups is 70% or more, as calculated according to the following Equation 1, and a ratio of vinylidene end groups is 10% or less, as calculated according to the following Equation 2:

Ratio of vinyl end groups (%)=[(Mn/42)×2×([Vi]/1000)]×100    [Equation 1]

Ratio of vinylidene end groups (%)=[(Mn/42)×2×([Vd]/1000)]×100    [Equation 2]

(in Equations 1 and 2, Mn is a value of the number average molecular weight (g/mol) of homopolypropylene, [Vi] is the number of the vinyl end groups per 1000 carbon atoms, and [Vd] is the number of the vinylidene end groups per 1000 carbon atoms)

Advantageous Effects

A transition metal compound according to the present invention may exhibit excellent catalytic activity, may allow formation of a macromonomer which is a polymer in which a double bond is formed at the end of a chain, and may improve a melt strength characteristic when used in polymerization of polypropylene.

DETAILED DESCRIPTION OF THE EMBODIMENTS

The terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components, or combinations thereof beforehand.

The present invention may be variously modified and have various exemplary embodiments, and specific exemplary embodiments are exemplified and explained in detail. However, it is not intended to limit the present invention to the specific exemplary embodiments and it must be understood that the present invention includes every modifications, equivalents, or replacements included in the spirit and technical scope of the present invention.

Hereinafter, a transition metal compound according to specific embodiments of the present invention, a catalyst composition including the same, and a method of preparing a homopolypropylene using the same will be described.

Specifically, the transition metal compound according to one embodiment of the present invention is represented by the following Chemical Formula 1:

[Chemical Formula 1]

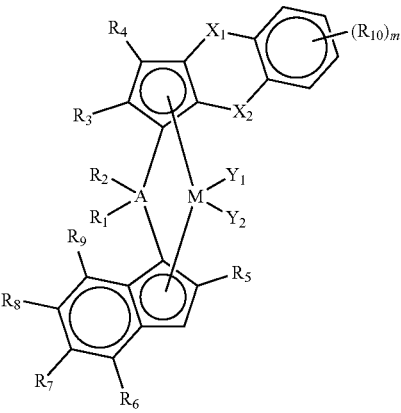

in Chemical Formula 1,

A is an element of Group 14;

M is a transition metal of Group 4, $R_1$ to $R_5$ are each independently $C_{1-20}$ alkyl, $R_6$ is $C_{6-20}$ aryl unsubstituted or substituted with $C_{1-20}$ alkyl, $R_7$ to $R_9$ are each independently hydrogen, $C_{1-20}$ alkyl, $C_{2-20}$ alkenyl, $C_{6-30}$ aryl, $C_{7-30}$ alkylaryl, or $C_{7-30}$ arylalkyl, or two adjacent groups of $R_7$ to $R_9$ combine with each other to form an alicyclic ring, $R_{10}$ is each independently hydrogen, $C_{1-20}$ alkyl, $C_{2-20}$ alkenyl, $C_{6-30}$ aryl, $C_{7-30}$ alkylaryl, or $C_{7-30}$ arylalkyl, $X_1$ and $X_2$ are each independently a single bond, S, or $CR_aR_b$, wherein at least one of $X_1$ and $X_2$ is S, and $R_a$ and $R_b$ in $CR_aR_b$ are each independently hydrogen, $C_{1-20}$ alkyl, $C_{2-20}$ alkenyl, $C_{6-30}$ aryl, $C_{7-30}$ alkylaryl, or $C_{7-30}$ arylalkyl, $Y_1$ and $Y_2$ are each independently halogen, and m is an integer of 1 to 4.

In the present specification, the following terms may be defined as follows unless there is a specific limitation.

The halogen may be fluorine (F), chlorine (Cl), bromine (Br), or iodine (I).

The $C_{1-20}$ alkyl group includes a linear, branched, or cyclic alkyl group. Specifically, the $C_{1-20}$ alkyl group may be a linear $C_{1-18}$, $C_{1-12}$, or $C_{1-6}$ alkyl group; a branched $C_{3-18}$, $C_{3-12}$, or $C_{3-8}$ alkyl group; or a cyclic $C_{3-20}$, $C_{3-18}$, or $C_{3-12}$ alkyl group. Specific examples thereof may include a methyl group, an ethyl group, an n-propyl group, an iso-propyl group, an n-butyl group, an iso-butyl group, a t-butyl group, an n-pentyl group, an iso-pentyl group, a neo-pentyl group, a cyclopropyl group, a cyclopentyl group, a cyclohexyl group, etc., but are not limited thereto.

The $C_{2-20}$ alkenyl group includes a linear, branched, or cyclic alkenyl group. Specifically, the $C_{2-20}$ alkenyl group may be a linear $C_{2-18}$, $C_{2-12}$, or $C_{2-6}$ alkenyl group; a branched $C_{3-18}$, $C_{3-12}$, or $C_{3-8}$ alkenyl group; or a cyclic $C_{3-20}$, $C_{3-18}$, or $C_{3-12}$ alkenyl group. Specific examples thereof may include an ethenyl group, a propenyl group, a butenyl group, a pentenyl group, a cyclohexenyl group, etc., but are not limited thereto.

The $C_{6-30}$ aryl group may refer to a monocyclic, bicyclic, or tricyclic aromatic hydrocarbon. Specifically, the $C_{6-30}$ aryl group may be a phenyl group, a naphthyl group, or an anthracenyl group.

The $C_{7-30}$ alkylaryl group may refer to a substituent in which one or more hydrogen atoms of aryl are substituted with alkyl. Specifically, the $C_{7-30}$ alkylaryl group may be methylphenyl, ethylphenyl, n-propylphenyl, iso-propylphenyl, n-butylphenyl, iso-butylphenyl, tert-butylphenyl, cyclohexylphenyl, etc.

The $C_{7-30}$ arylalkyl group may refer to a substituent in which one or more hydrogen atoms of alkyl are substituted with aryl. Specifically, the $C_{7-30}$ arylalkyl group may be benzyl, phenylpropyl, phenylhexyl, etc.

More specifically, in Chemical Formula 1, A may be carbon (C), silicon (Si), or germanium (Ge), and of them, A may be Si.

In Chemical Formula 1, M may be titanium (Ti), zirconium (Zr), or hafnium (Hf), and of them, M may be Zr. Since Zr has more orbitals capable of accepting electrons than other transition metals of Group 4, such as Hf, etc., it may easily bind to monomers with higher affinity, and as a result, may exhibit superior catalytic activity. In addition, Zr may improve storage stability of a metal complex.

Further, in Chemical Formula 1, $R_1$ to $R_5$ may be each independently a linear or branched $C_{1-20}$, or $C_{1-12}$, or $C_{1-6}$ alkyl, and more specifically, may be a linear $C_{1-6}$ or $C_{1-4}$ alkyl such as methyl, ethyl, propyl, or n-butyl. Much more specifically, all of $R_1$ to $R_5$ may be methyl.

Further, in Chemical Formula 1, A may be silicon, M may be zirconium, and $R_1$ to $R_5$ may be each independently a linear $C_{1-6}$ or $C_{1-4}$ alkyl, and much more specifically, all of $R_1$ to $R_5$ may be methyl.

Further, in Chemical Formula 1, $R_6$ may be $C_{6-12}$ aryl unsubstituted or substituted with linear or branched $C_{1-8}$ alkyl, and more specifically, phenyl or naphthyl which is unsubstituted or substituted with branched $C_{3-6}$ alkyl. When substituted with alkyl, the aryl may be substituted with one or more, more specifically, 1 or 2 alkyl(s). Specific examples of $R_6$ may include phenyl, 4-t-butylphenyl, 3,5-di-t-butylphenyl, naphthyl, etc. Further, when $R_6$ is a phenyl group substituted with a branched $C_{3-6}$ alkyl group, the substitution position of the branched $C_{3-6}$ alkyl group to the phenyl group may be the 4-position corresponding to a para position to a $R_6$ position bonded to an indenyl group.

Further, in Chemical Formula 1, A may be silicon, M may be zirconium, and $R_6$ may be phenyl or naphthyl unsubstituted or substituted with branched $C_{3-6}$ alkyl, and more specifically, phenyl, 4-t-butylphenyl, 3,5-di-t-butylphenyl, or naphthyl.

Further, in Chemical Formula 1, $R_1$ to $R_5$ may be each independently linear $C_{1-6}$ or $C_{1-4}$ alkyl, and more specifically, all of $R_1$ to $R_5$ may be methyl, and $R_6$ may be phenyl or naphthyl unsubstituted or substituted with branched $C_{3-6}$ alkyl, and more specifically, phenyl, 4-t-butylphenyl, 3,5-di-t-butylphenyl, or naphthyl.

Further, in Chemical Formula 1, A may be silicon, M may be zirconium, and $R_1$ to $R_5$ may be each independently linear $C_{1-6}$ or $C_{1-4}$ alkyl, and more specifically, all of $R_1$ to $R_5$ may be methyl, and $R_6$ may be phenyl or naphthyl unsubstituted or substituted with branched $C_{3-6}$ alkyl, and more specifically, phenyl, 4-t-butylphenyl, 3,5-di-t-butylphenyl, or naphthyl.

Further, in Chemical Formula 1, $R_7$ to $R_9$ may be each independently hydrogen, $C_{1-12}$ alkyl, $C_{2-12}$ alkenyl, $C_{6-18}$ aryl, $C_{7-20}$ alkylaryl, or $C_{7-20}$ arylalkyl, or two adjacent groups of $R_7$ to $R_9$, for example, $R_7$ and $R_8$ or $R_8$ and $R_9$ combine with each other to form a $C_{3-12}$, $C_{4-8}$, or $C_{5-6}$ alicyclic ring (or alicyclic ring structure), such as cyclopentyl.

Further, in Chemical Formula 1, A may be silicon, M may be zirconium, and $R_7$ to $R_9$ may be each independently hydrogen, or two adjacent groups of $R_7$ to $R_9$ combine with each other to form a cyclopentyl group.

Further, in Chemical Formula 1, $R_1$ to $R_5$ may be each independently linear $C_{1-6}$ or $C_{1-4}$ alkyl, and more specifically, all of $R_1$ to $R_5$ may be methyl, and $R_7$ to $R_9$ may be each independently hydrogen, or two adjacent groups of $R_7$ to $R_9$ combine with each other to form a cyclopentyl group.

Further, in Chemical Formula 1, $R_6$ may be phenyl or naphthyl unsubstituted or substituted with branched $C_{3-6}$ alkyl, and more specifically, phenyl, 4-t-butylphenyl, 3,5-di-t-butylphenyl, or naphthyl, and $R_7$ to $R_9$ may be each independently hydrogen, or two adjacent groups of $R_7$ to $R_9$ combine with each other to form a cyclopentyl group.

Further, in Chemical Formula 1, A may be silicon, M may be zirconium, $R_1$ to $R_5$ may be each independently linear $C_{1-6}$ or $C_{1-4}$ alkyl group, and more specifically, all of $R_1$ to $R_5$ may be methyl, and $R_6$ may be phenyl or naphthyl unsubstituted or substituted with branched $C_{3-6}$ alkyl, and more specifically, phenyl, 4-t-butylphenyl, 3,5-di-t-butylphenyl, or naphthyl, and $R_7$ to $R_9$ may be each independently hydrogen, or two adjacent groups of $R_7$ to $R_9$ combine with each other to form a cyclopentyl group.

Further, in Chemical Formula 1, $R_{10}$ may be each independently hydrogen, $C_{1-12}$ alkyl, $C_{2-12}$ alkenyl, $C_{6-12}$ aryl, $C_{7-15}$ alkylaryl, or $C_{7-15}$ arylalkyl, and more specifically, hydrogen, or linear or branched $C_{1-6}$ alkyl. Specific examples thereof may include hydrogen, methyl, ethyl, propyl, n-butyl, t-butyl, etc.

Further, in Chemical Formula 1, $R_1$ to $R_5$ may be each independently linear $C_{1-6}$ or $C_{1-4}$ alkyl, and more specifically, all of $R_1$ to $R_5$ may be methyl, $R_6$ may be phenyl or naphthyl unsubstituted or substituted with branched $C_{3-6}$ alkyl, and more specifically, phenyl, 4-t-butylphenyl, 3,5-di-t-butylphenyl, or naphthyl, and $R_7$ to $R_9$ may be each independently hydrogen, or two adjacent groups of $R_7$ to $R_9$ combine with each other to form a cyclopentyl group. In this regard, $R_{10}$ may be hydrogen, or linear or branched $C_1$-6 alkyl, and more specifically, hydrogen.

Further, in Chemical Formula 1, $X_1$ and $X_2$ may be each independently a single bond, S, or $CR_aR_b$, wherein any one of $X_1$ and $X_2$ may be S, and more specifically, any one of $X_1$ and $X_2$ may be S, and the other may be a single bond. In other words, $X_1$ may be S and $X_2$ may be a single bond, or $X_1$ may be a single bond and $X_2$ may be S. In addition, when $X_1$ or $X_2$ is $CR_aR_b$, more specifically, $R_a$ and $R_b$ may be each independently hydrogen, $C_{1-10}$ alkyl, $C_{2-10}$ alkenyl, $C_{6-12}$ aryl, $C_{7-13}$ alkylaryl, or $C_{7-13}$ arylalkyl.

Further, in Chemical Formula 1, A may be silicon, M may be zirconium, and any one of $X_1$ and $X_2$ may be S, and the other may be a single bond.

Further, in Chemical Formula 1, $R_1$ to $R_5$ may be each independently linear $C_{1-6}$ or $C_{1-4}$ alkyl, and more specifically, all of $R_1$ to $R_5$ may be methyl, and any one of $X_1$ and $X_2$ may be S, and the other may be a single bond.

Further, in Chemical Formula 1, $R_6$ may be phenyl or naphthyl unsubstituted or substituted with branched $C_{3-6}$ alkyl, and more specifically, phenyl, 4-t-butylphenyl, 3,5-di-t-butylphenyl, or naphthyl, and any one of $X_1$ and $X_2$ may be S, and the other may be a single bond.

Further, in Chemical Formula 1, $R_7$ to $R_9$ may be each independently hydrogen, or two adjacent groups of $R_7$ to $R_9$ combine with each other to form a cyclopentyl group, and any one of $X_1$ and $X_2$ may be S, and the other may be a single bond.

Further, in Chemical Formula 1, $R_1$ to $R_5$ may be each independently linear $C_{1-6}$ or $C_{1-4}$ alkyl, and more specifically, all of $R_1$ to $R_5$ may be methyl, $R_6$ may be phenyl or naphthyl unsubstituted or substituted with branched $C_{3-6}$ alkyl, and more specifically, phenyl, 4-t-butylphenyl, 3,5-di-t-butylphenyl, or naphthyl, and $R_7$ to $R_9$ may be each independently hydrogen, or two adjacent groups of $R_7$ to $R_9$ combine with each other to form a cyclopentyl group, and any one of $X_1$ and $X_2$ may be S, and the other may be a single bond.

Further, in Chemical Formula 1, A may be silicon, M may be zirconium, and $R_1$ to $R_5$ may be each independently linear $C_{1-6}$ or $C_{1-4}$ alkyl, and more specifically, all of $R_1$ to $R_5$ may be methyl, and $R_6$ may be phenyl or naphthyl unsubstituted or substituted with branched $C_{3-6}$ alkyl, and more specifically, phenyl, 4-t-butylphenyl, 3,5-di-t-butylphenyl, or naphthyl, and $R_7$ to $R_9$ may be each independently hydrogen, or two adjacent groups of $R_7$ to $R_9$ combine with each other to form a cyclopentyl group, and any one of $X_1$ and $X_2$ may be S, and the other may be a single bond. At this time, $R_{10}$ may be hydrogen.

Further, in Chemical Formula 1, $Y_1$ and $Y_2$ may be each independently chloro.

Representative examples of the compound represented by Chemical Formula 1 may include compounds of the following structures:

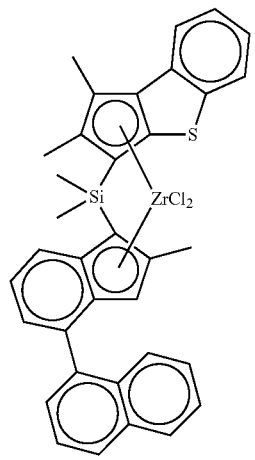
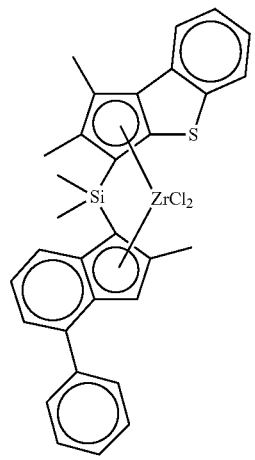

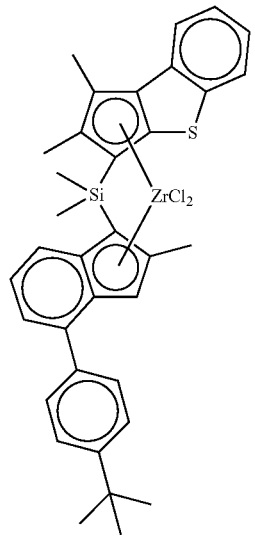

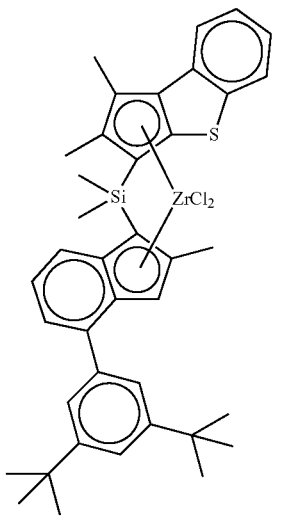

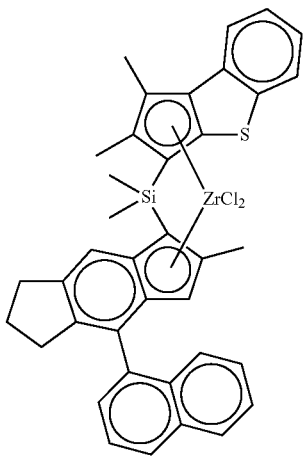

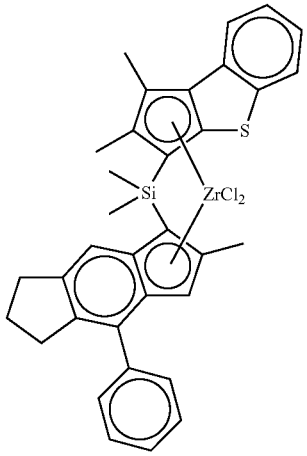

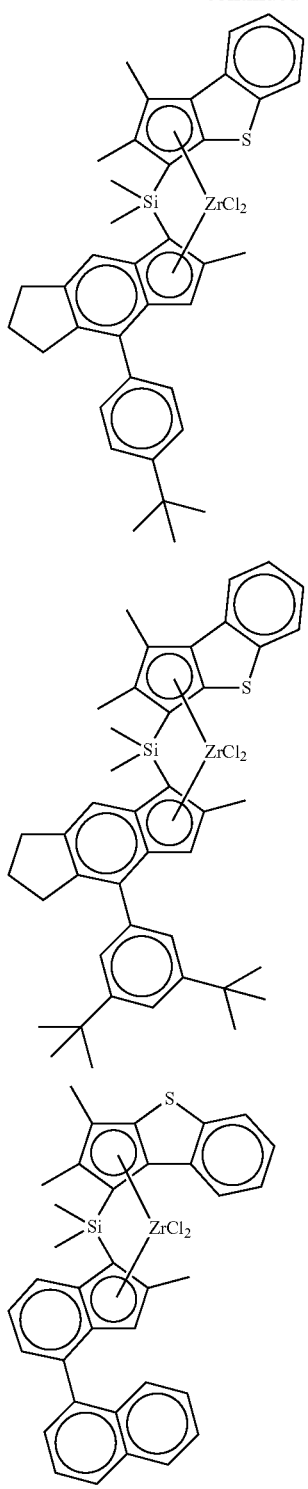
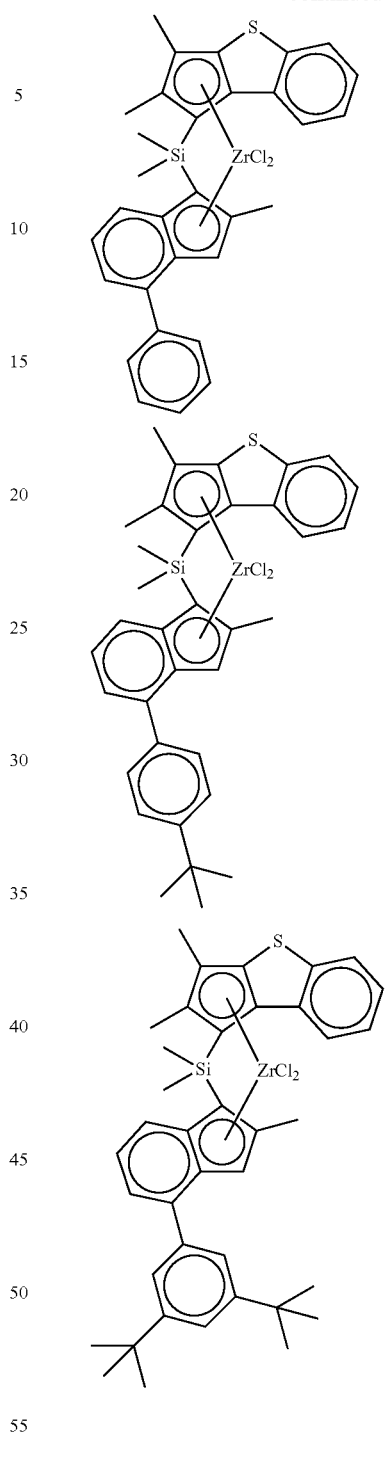

-continued

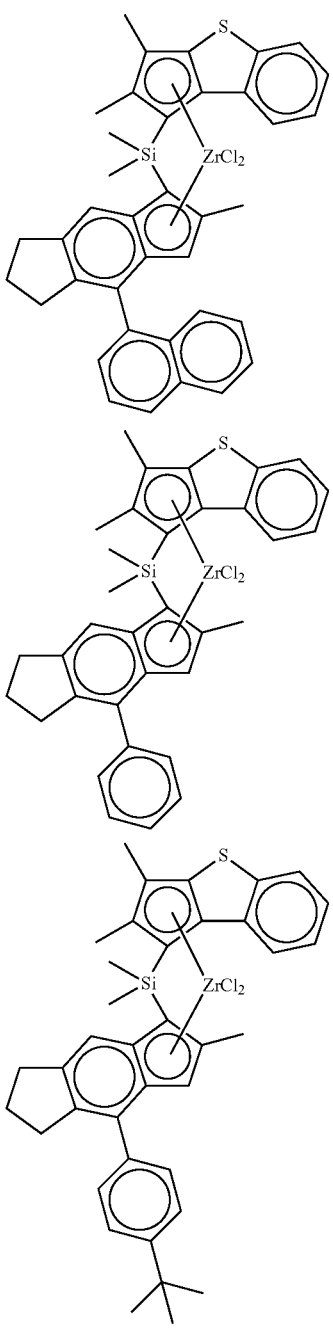

-continued

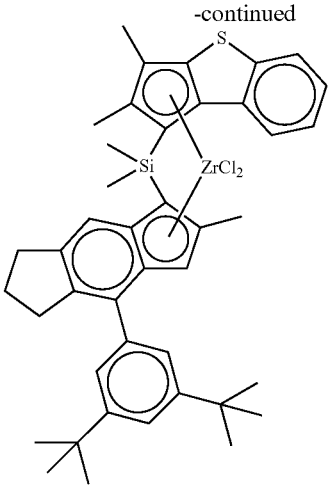

In general, a polymer having a saturated end group (terminal group) is produced by hydrogenation during chain termination in the presence of hydrogen. Production of a polymer containing a double bond as an end group may occur by a structural feature of a catalyst.

Production of a polymer containing a double bond at an end group may occur according to two mechanisms of β-elimination or β-Me-extraction, as represented by the following Reaction Scheme 1:

[Reaction Scheme 1]

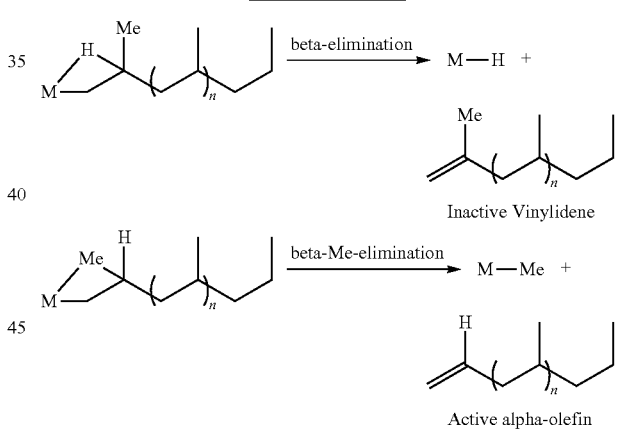

in Reaction Scheme 1, M is a metal atom, H is a hydrogen atom, and Me is methyl.

In general, β-elimination more easily occurs, but a vinylidene end group produced at this time is substituted with a substituent to lose its role as a monomer, and therefore, it is inactive as a macromonomer. In contrast, a vinyl end group generated by β-Me-extraction reaction is active and may serve as a monomer.

The transition metal compound according to one embodiment of the present invention includes S having an unshared electron pair in a ligand structure, thereby providing more electrons to the metal atom. Accordingly, since stability may be maintained even when the metal atom has a vacant site, the vinyl end group may be created. In contrast, in the case of a common transition metal compound, since a metal-hydrogen bond (Metal-H bond) is formed to become stable when a metal atom has a vacant site, an inactive vinylidene end group is generated. Accordingly, when the transition metal compound according to the present invention is used as a catalyst for producing a polymer, it is possible to form a polymer having a high ratio of vinyl end groups and a low ratio of vinylidene end groups.

In addition, since two ligand structures have different asymmetric structures, the transition metal compound may have various characteristics or selective advantages of the two different ligands, and as a result, it may exhibit excellent catalytic activity.

Among the two ligands, in the case of a first ligand including a cyclopentadienyl group in which a binary ring structure including S is fused, positions 2 and 3 are substituted with $C_{1-20}$ alkyl($R_3$ and $R_4$), respectively. In the case of a second ligand having an indene structure or a structure in which an alicyclic ring is further fused to the benzene ring of the indene, position 2 is substituted with $C_{1-20}$ alkyl ($R_5$), and position 4 is substituted with $C_{6-20}$ aryl ($R_6$) unsubstituted or substituted with $C_{1-20}$ alkyl. Accordingly, excellent catalytic activity may be exhibited by an inductive effect capable of sufficiently supplying electrons, and when the transition metal compound is used as a polymerization catalyst for polypropylene, stereoregularity (tacticity) of the molecular structure of polypropylene may be easily controlled, thereby lowering a melting point.

Particularly, $R_6$ substituted at position 4 of the second ligand includes an aryl group to increase aromaticity of the transition metal compound, thereby further enhancing the catalytic activity.

In addition, the transition metal compound includes a functional group A substituted with $C_{1-20}$ alkyl ($R_1$ and $R_2$) as a bridge group connecting two ligands, and thus the size of the atom increases and the available angle increases. As a result, easy access to the monomer is achieved, thereby exhibiting more excellent catalytic activity. In addition, $R_1$ and $R_2$ which are substituents of A increase solubility of the transition metal compound, thereby improving the loading efficiency when prepared as a supported catalyst.

The transition metal compound represented by Chemical Formula 1 may be prepared by reacting a ligand compound represented by the following Chemical Formula 2 with a halogenated compound of a transition metal (M) of Group 4. Therefore, according to another embodiment of the present invention, the ligand compound represented by the following Chemical Formula 2 is also provided as a precursor useful for preparing the transition metal compound:

[Chemical Formula 2]

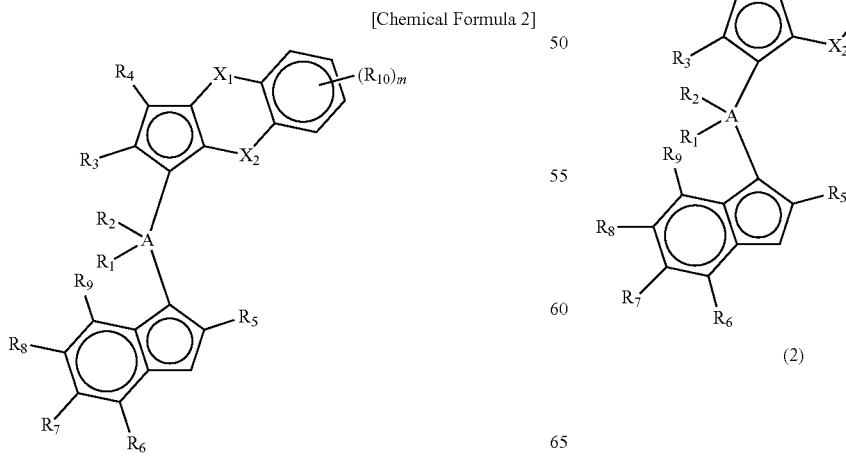

in Chemical Formula 2, A, $R_1$ to $R_{10}$, $X_1$, $X_2$, and m are the same as defined above.

The transition metal compound may be prepared through a reaction according to the following Reaction Scheme 2. The following Reaction Scheme 2 is only for explaining the present invention, but the present invention is not limited thereto.

Referring to the following Reaction Scheme 2, the transition metal compound (1) may be prepared by a method including the steps of preparing a compound (3c), to which a bridge group is bound, by reacting a compound (3a) for forming a first ligand structure containing a cyclopentadienyl group, in which a binary ring structure including S is fused, with a compound (3b) providing a bridge group of $AR_1R_2$, such as dichlorodimethylsilane; preparing a ligand compound (2) by reacting the compound (3c), to which the bridge group is bound, with a compound (3d) for forming a second ligand structure including an indene structure; and preparing the transition metal compound (1) by reacting the ligand compound (2) with a halogenated compound (metal halide) (3e) of a transition metal of Group 4:

[Reaction Scheme 2]

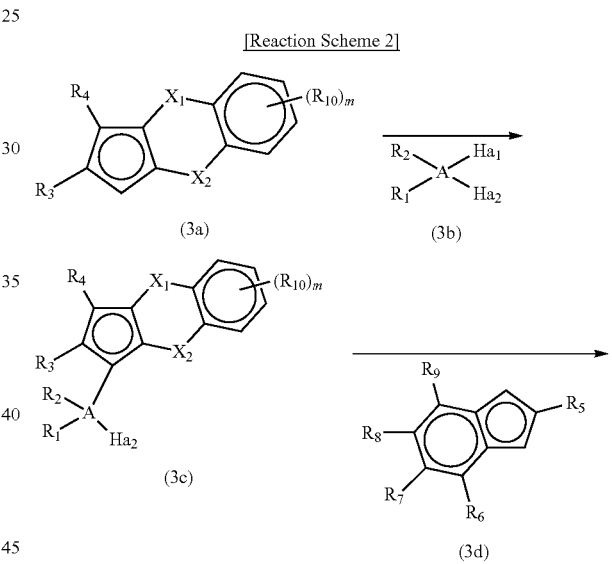

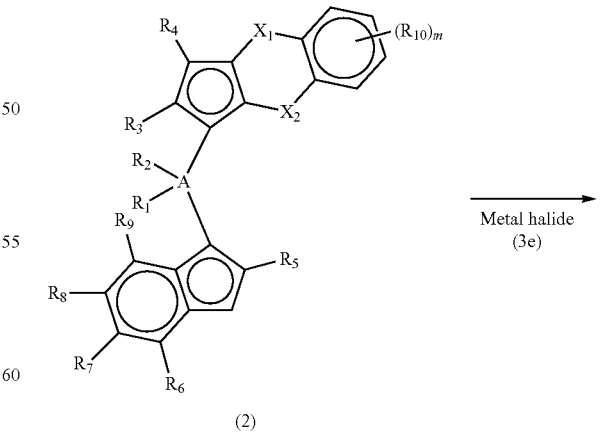

-continued

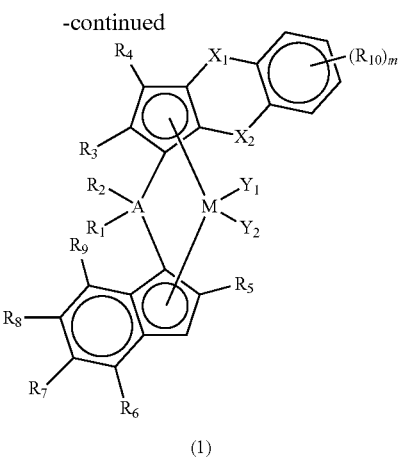

(1)

in Reaction Scheme 2, A, M, $R_1$ to $R_{10}$, $X_1$, $X_2$, $Y_1$, $Y_2$, and m are the same as defined above, and $Ha_1$ and $Ha_2$ are each independently a halogen group such as chloro, etc.

The reaction in each step may be performed by applying known reactions, and a more detailed synthesis method may be referred to Synthesis Examples described below.

Meanwhile, according to another embodiment of the present invention, provided is a catalyst composition including the transition metal compound represented by Chemical Formula 1.

By including the above-described transition metal compound, the catalyst composition may be useful for the production of polypropylene, in particular, homopolypropylene, in which a double bond is formed at the end of the chain, and a high content of the vinyl end group as the end group including the double bond is included.

In addition, the transition metal compound may be used as a single component, or may be used as a supported catalyst after being supported on a carrier. When used as the supported catalyst, the produced homopolypropylene may have excellent morphology and physical properties, and may be suitably used for a common slurry polymerization, bulk polymerization, or gas-phase polymerization process.

Accordingly, the catalyst composition may further include a carrier. As the carrier, specifically, silica-based carriers such as silica, silica-alumina, silica-magnesia, etc. may be used. Further, the surface may be modified by calcination before use or surface moisture may be removed by drying such that the carrier has a highly reactive hydroxyl group, silanol group, or siloxane group on the surface. For example, silica prepared by calcination of silica gel or silica dried at a high temperature may be used, and these may usually contain components of oxides, carbonates, sulfates, and nitrates, such as $Na_2O$, $K_2CO_3$, $BaSO_4$, $Mg(NO_3)_2$, etc.

The temperature at which the carrier is calcined or dried may be 200° C. to 700° C., and more specifically 250° C. to 650° C. When the calcination or drying temperature of the carrier is too low at 200° C. or lower, moisture remaining in the carrier is excessive so that the moisture on the surface may react with a cocatalyst, the cocatalyst loading efficiency may be relatively high due to the hydroxyl groups present in excess, but this requires a large amount of cocatalyst. When the calcination or drying temperature is too high at higher than 700° C., pores on the carrier surface combine with each other to decrease the surface area, and many hydroxyl groups or silanol groups on the surface are lost such that only siloxane groups are left, whereby reaction sites with the cocatalyst may be decreased.

For example, an amount of the hydroxyl group on the carrier surface may be 0.1 mmol/g to 10 mmol/g or 0.5 mmol/g to 5 mmol/g. The amount of the hydroxyl group on the carrier surface may be adjusted by the preparation method and preparation conditions or drying conditions of the carrier, for example, temperature, time, vacuum or spray drying, etc. When the amount of the hydroxyl group is too small, the number of reaction sites with the cocatalyst is small, and when the amount is too large, the hydroxyl group may result from the moisture other than the hydroxyl group present on the surface of the carrier particles.

Among the above carriers, in the case of silica, particularly, silica prepared by calcining silica gel, the functional group of the transition metal compound is supported on the silica carrier by a chemical bond, and therefore, there is almost no catalyst released from the surface of the carrier during the propylene polymerization process, and as a result, when polypropylene is prepared by slurry or gas phase polymerization, fouling in which polymer particles stick to the reactor walls or stick to each other may be minimized.

When supported on the carrier, the transition metal compound may be supported in an amount of 10 μmol or more, or 20 μmol or more, and 100 μmol or less, or 80 μmol or less, based on the weight of the carrier, for example, 1 g of silica. When the transition metal compound is supported in the above content range, it may exhibit appropriate activity of the supported catalyst, which may be advantageous in terms of maintaining catalyst activity and economic feasibility.

In addition, the catalyst composition may further include a cocatalyst in terms of improving catalytic activity and process stability. The cocatalyst may include one or more of compounds represented by the following Chemical Formula 4, Chemical Formula 5, or Chemical Formula 6:

$$-[Al(R_{11})-O]_m-$$ [Chemical Formula 4]

in Chemical Formula 4, $R_{11}$ may be the same as or different from each other, and each independently halogen; $C_{1-20}$ hydrocarbon; or $C_{1-20}$ hydrocarbon substituted with halogen; and m is an integer of 2 or more;

$$J(R_{12})_3$$ [Chemical Formula 5]

in Chemical Formula 5, $R_{12}$ may be the same as or different from each other, and each independently halogen; $C_{1-20}$ hydrocarbon; or $C_{1-20}$ hydrocarbon substituted with halogen; and J is aluminum or boron; and $$[E-H]^+[ZQ_4]^- \text{ or } [E]^+[ZQ_4]^-$$ [Chemical Formula 6]

in Chemical Formula 6,

E is a neutral or cationic Lewis base;

H is a hydrogen atom;

Z is an element of Group 13; and

Q may be the same as or different from each other, and each independently a $C_{6-20}$ aryl group or a $C_{1-20}$ alkyl group in which one or more hydrogen atoms are unsubstituted or substituted with halogen, $C_{1-20}$ hydrocarbon, alkoxy, or phenoxy.

Examples of the compound represented by Chemical Formula 4 may include alkylaluminoxane-based compounds such as methylaluminoxane, ethylaluminoxane, isobutylaluminoxane, butylaluminoxane, etc., and of them, any one or a mixture of two or more thereof may be used. In the alkylaluminoxane-based compounds, alkyl is the same as defined above, specifically, $C_{1-20}$ alkyl, and more specifically, linear or branched $C_{1-6}$ alkyl, such as methyl, ethyl, isobutyl, etc.

Examples of the compound represented by Chemical Formula 5 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and more specifically, it may be selected from trimethylaluminum, triethylaluminum, and triisobutylaluminum.

Examples of the compound represented by Chemical Formula 6 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentafluorophenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl)boron, tributylammoniumtetra(p-trifluoromethylphenyl)boron, triphenylcarboniumtetra(p-trifluoromethylphenyl)boron, triphenylcarboniumtetrapentafluorophenylboron, etc., and of them, any one or a mixture of two or more thereof may be used.

Among the above-described cocatalysts, the compound of Chemical Formula 4, specifically, alkylaluminoxane acts as a scavenger of hydroxyl groups present on the surface of the carrier, thereby improving the catalytic activity, and also converts the halogen groups in the transition metal compound into methyl groups, thereby promoting growth of the polypropylene chain.

The cocatalyst may be supported in an amount of 3 mmol or more, or 4 mmol or more, and 25 mmol or less, or 20 mmol or less, based on the weight of the carrier, for example, 1 g of silica. When the cocatalyst is included in the above content range, it is possible to sufficiently obtain the effects of improving the catalytic activity and reducing the generation of fine particles by using the cocatalyst.

In addition, the catalyst composition may further include an antistatic agent. As the antistatic agent, specifically, an ethoxylated alkylamine of the following Chemical Formula 7 may be used, and in addition, any component which is obviously known as the antistatic agent may be used without limitation. By using such an antistatic agent, generation of static electricity during the production of homopolypropylene may be suppressed to further improve physical properties of the produced homopolypropylene.

$R_{13}N$—$(CH_2CH_2OH)_2$          [Chemical Formula 7]

in Chemical Formula 7, $R_{13}$ may be $C_{8-30}$ alkyl, and when $R_{13}$ includes an alkyl group having the number of carbon atoms in the above range, it may exhibit the effect of reducing fine particles through an excellent antistatic action without causing an unpleasant odor.

More specifically, the ethoxylated alkylamine may be a compound in which $R_{13}$ in Chemical Formula 7 is linear $C_{8-22}$ alkyl, linear $C_{12-18}$ alkyl, or linear $C_{13-15}$ alkyl, and of these compounds, any one alone or a mixture of two or more thereof may be used. Further, commercially available Atmer 163™ (manufactured by CRODA), etc. may be used.

When the antistatic agent is further included, it may be included in an amount of 1 g to 10 g, and more specifically, 1 g to 5 g, based on 100 g of the carrier.

When the catalyst composition includes all of the above-described carrier, cocatalyst, and antistatic agent, the catalyst composition may be prepared by a preparation method including the steps of supporting the cocatalyst onto the carrier; supporting the transition metal compound onto the cocatalyst-supported carrier; and adding the antistatic agent in a solution state to the carrier onto which the cocatalyst and the transition metal compound are supported. As described above, the catalyst composition having a structure, in which the cocatalyst, the transition metal compound, and the antistatic agent in this order are supported onto the carrier, may exhibit high catalytic activity together with excellent process stability in the production process of polypropylene.

The catalyst composition may be used in a slurry state or in a diluted state in a solvent, or may be used in the form of a mud catalyst mixed with an oil and grease mixture, depending on a polymerization method.

When the catalyst composition is used in a slurry state or in a diluted state in a solvent, the solvent may be exemplified by an aliphatic hydrocarbon solvent having 5 to 12 carbon atoms which is suitable for a polymerization process of a propylene monomer, for example, pentane, hexane, heptane, nonane, decane, or isomers thereof, an aromatic hydrocarbon solvent such as toluene or benzene, a hydrocarbon solvent substituted with a chlorine atom such as dichloromethane or chlorobenzene, etc., and any one or a mixture of two or more thereof may be used. In this case, the catalyst composition may further include the above-described solvent, and before use, the solvent may be treated with a small amount of alkylaluminum, thereby removing a small amount of water or air which may act as a catalytic poison.

In addition, when a polymerization method such as continuous bulk polymerization is used, the catalyst composition may be used in the form of a mud catalyst mixed with an oil and grease. In this case, as compared with the case of being dissolved in or diluted with a solvent, an amount of a volatile organic compound contained in the prepared homopolypropylene may be further decreased, and as a result, an odor caused by the volatile organic compound may also be decreased.

According to still another embodiment of the present invention, provided is a method of preparing a homopolypropylene using the catalyst composition including the transition metal compound represented by Chemical Formula 1, and a polypropylene prepared thereby.

Specifically, the method of preparing a homopolypropylene includes the step of polymerizing propylene monomers by introducing hydrogen in the presence of the catalyst composition including the transition metal compound.

In the preparation method, the polymerization process may be performed by contacting the catalyst composition including the transition metal compound with propylene in the presence of hydrogen gas.

Here, the hydrogen gas may be injected in an amount of 50 ppm to 2000 ppm, based on the total weight of the propylene monomer. By adjusting the use amount of hydrogen gas, sufficient catalyst activity is achieved, and a molecular weight distribution and flowability of the homopolypropylene composition to be produced may be adjusted within a desired range, and therefore, the homopolypropylene polymer having appropriate physical properties depending on the purpose of use may be produced. The hydrogen gas may be included in an amount of 70 ppm or more, 100 ppm or more, or 300 ppm or more, and 1500 ppm or less, or 1000 ppm or less.

The polymerization process may be performed by a continuous polymerization process, and for example, various polymerization processes which are known as a polymerization reaction of an olefin monomer, such as a continuous solution polymerization process, a bulk polymerization process, a suspension polymerization process, a slurry polymerization process, or an emulsion polymerization process, etc., may be adopted. Particularly, from the viewpoint of obtaining a uniform molecular weight distribution and commercial manufacturability, the continuous bulk-slurry polymerization process may be preferred.

Further, the polymerization process may be performed at a temperature of 40° C. or higher, or 60° C. or higher, and 110° C. or lower, or 100° C. or lower, and when a pressure condition is further controlled, the polymerization process may be performed at a pressure of 1 kgf/cm$^2$ or more, or 20 kgf/cm$^2$ or more, and 100 kgf/cm$^2$ or less, or 50 kgf/cm$^2$ or less.

In addition, a trialkylaluminum such as triethylaluminum may be selectively added during the polymerization reaction.

When moisture or impurities are present in a polymerization reactor, the catalyst is partially decomposed. Since the trialkylaluminum serves as a scavenger which captures moisture or impurities present in the reactor or moisture included in the monomer in advance, activity of the catalyst used in the production may be maximized, and as a result, a homopolypropylene having excellent physical properties, particularly, a narrow molecular weight distribution, may be more efficiently produced. Specifically, in the trialkylaluminum, alkyl is the same as defined above, and may be specifically $C_{1-20}$ alkyl, and more specifically, linear or branched $C_{1-6}$ alkyl, such as methyl, ethyl, isobutyl, etc.

The content of the trialkylaluminum is not particularly limited, and it is preferable that the content is appropriately controlled according to the kind of the monomer and polymerization conditions.

The homopolypropylene according to one embodiment of the present invention, which is prepared by the above-described preparation method, may include functional groups containing double bonds, such as a vinyl group (—CH=CH$_2$) or a vinylidene group (:C=CH$_2$), etc., at the end of the chain, and may include a high content of the vinyl end group as the end group containing double bonds. As a result, improved melt strength may be achieved.

Specifically, with regard to the homopolypropylene, a ratio of vinyl end groups may be 70% or more, or 80% or more, and 90% or less, as calculated according to the following Equation 1, and a ratio of vinylidene end groups may be 10% or less, 8% or less, and 4% or more, as calculated according to the following Equation 2:

$$\text{Ratio of vinyl end groups (\%)} = [(Mn/42) \times 2 \times ([Vi]/1000)] \times 100 \quad \text{[Equation 1]}$$

$$\text{Ratio of vinylidene end groups (\%)} = [(Mn/42) \times 2 \times ([Vd]/1000)] \times 100 \quad \text{[Equation 2]}$$

(in Equations 1 and 2, Mn is a value of the number average molecular weight (g/mol) of homopolypropylene, [Vi] is the number of the vinyl end groups per 1000 carbon atoms, and [Vd] is the number of the vinylidene end groups per 1000 carbon atoms)

Further, with regard to the homopolypropylene, the number of the vinyl end groups per 1000 carbon atoms may be 0.29 or more, or 0.33 or more, or 0.5 or more, and 17 or less, or 15 or less, or 7 or less, and the number of the vinylidene end groups per 1000 carbon atoms may be 2.5 or less, or 2 or less, or 1 or less, and 0.03 or more, or 0.04 or more.

In the present invention, the numbers of the vinyl end group and the vinylidene end group in the homopolypropylene may be measured by $^1$H NMR analysis, and a specific measurement method is as described in Experimental Example below.

Further, in the present invention, the number average molecular weight (Mn) of homopolypropylene may be measured by gel permeation chromatography (GPC). Specifically, the measurement may be performed using a Waters PL-GPC220 instrument using a PLgel MIX-B column of a 300-mm length from Polymer Laboratories, wherein an evaluation temperature is 160° C., 1,2,4-trichlorobenzene is used as a solvent, and a flow rate is 1 mL/min. In addition, a sample is prepared at a concentration of 10 mg/10 mL, and supplied in an amount of 200 mL. A calibration curve formed by using polystyrene standards was used to derive Mw and Mn values. The molecular weight (g/mol) of the polystyrene standards was nine types of 2,000/10,000/30,000/70,000/200,000/700,000/2,000,000/4,000,000/10,000,000.

In addition, the homopolypropylene has a number average molecular weight (Mn) of 1000 g/mol or more, 3000 g/mol or more, and 50,000 g/mol or less, or 40,000 g/mol or less.

As described above, the homopolypropylene according to one embodiment of the present invention may have the high content of vinyl end groups, and may also exhibit low Mn, thereby exhibiting excellent melt strength. Therefore, when the homopolypropylene is molded into a variety of products such as various molded articles, etc., it may exhibit excellent melt processability, together with mechanical properties such as high strength, etc.

According to still another embodiment of the present invention, provided is a molded article including the homopolypropylene. The article may be manufactured according to a common method, except that the above-described homopolypropylene of one embodiment is used.

MODE FOR INVENTION

Hereinafter, preferred exemplary embodiments are presented for better understanding of the present invention. However, the following exemplary embodiments are only for illustrating the present invention, and the content of the present invention is not limited to the following exemplary embodiments.

<Synthesis of Transition Metal Compound>

Synthesis Example 1

Preparation of Ligand Compound (1,2-dimethyl-3H-benzo[d]cyclopenta[b]thiophen-3-yl)dimethyl(2-methyl-4-(naphthalen-1-yl)-1H-inden-1-yl)silane 1 equivalent of 1,2-dimethyl-3H-benzo[d]cyclopenta[b]thiophene was dissolved in tetrahydrofuran (THF) (0.7 M) in a reactor, and n-BuLi (1.05 eq) was slowly added dropwise thereto at −25° C., followed by stirring at room temperature for 3 hours. Thereafter, dichlorodimethylsilane (1.05 eq) was added at −10° C., and stirred at room temperature for 24 hours to prepare a mono-Si solution.

Separately, 1 equivalent of 1-(2-methyl-1H-inden-4-yl)naphthalene was dissolved in a mixed solvent of toluene and THF (a mixing volume ratio=5:1, 0.7 M) in another reactor, and n-BuLi (1.05 eq) was slowly added dropwise thereto at −25° C., followed by stirring at room temperature for 3 hours. Thereafter, CuCN (2 mol %) was added, and stirred for 30 minutes, and then the mono-Si solution prepared previously was added in the same equivalent weight. Thereafter, the mixture was stirred at room temperature for 24 hours, worked-up with water, and dried to obtain a ligand compound.

Preparation of Transition Metal Compound (1,2-dimethyl-3H-benzo[d]cyclopenta[b]thiophen-3-yl)dimethyl(2-methyl-4-(naphthalen-1-yl)-1H-inden-1-yl)silane zirconium dichloride The ligand compound prepared above was dissolved in a mixed solvent of toluene and ether (a mixing volume ratio=2:1, 0.7M), and n-BuLi (2.05 eq) was added thereto at −25° C., followed by stirring at room temperature for 5 hours.

$ZrCl_4$ (1 eq) was mixed with toluene (0.17 M) in a separate flask to prepare a slurry. The prepared slurry was added to the ligand solution, followed by stirring at room temperature overnight.

After completion of the reaction, the solvent was dried under vacuum, and dichloromethane was injected again, and LiCl was removed by filtration. The filtrate was dried under vacuum, and toluene was added to perform recrystallization at room temperature. Then, the resulting solid was filtered and dried under vacuum to obtain the title transition metal compound.

$^1$H-NMR ($CDCl_3$, 500 MHz)
0.66 (4H, m), 0.94 (6H, t), 1.79 (6H, s), 2.12 (3H, s), 6.36 (1H, s), 7.39-7.52 (6H, m), 7.77 (1H, t), 7.93 (1H, d), 8.05-8.09 (2H, m), 8.20 (1H, d), 8.29 (1H, d), 8.50 (1H, d), 8.95 (1H, d)

Synthesis Example 2

A transition metal compound (1 b) having the structure presented in the following Table 1 was prepared in the same manner as in Synthesis Example 1, except that 2-methyl-4-phenyl-1H-indene was used, instead of 1-(2-methyl-1H-inden-4-yl)naphthalene, as a reactant in Synthesis Example 1.

$^1$H-NMR ($CDCl_3$, 500 MHz)
0.21 (6H, s), 1.79 (6H, s), 2.12 (3H, s), 6.36 (1H, s), 7.41-7.51 (9H, m), 7.93 (1H, d), 8.05 (1H, d), 8.29 (1H, d)

Synthesis Example 3

A transition metal compound (1c) having the structure presented in the following Table 1 was prepared in the same manner as in Synthesis Example 1, except that 4-(4-tert-butylphenyl)-2-methyl-1H-indene was used, instead of 1-(2-methyl-1H-inden-4-yl)naphthalene, as a reactant in Synthesis Example 1.

$^1$H-NMR ($CDCl_3$, 500 MHz)
0.66 (4H, m), 0.94 (6H, t), 1.33 (9H, s), 1.79 (6H, s), 2.12 (3H, s), 6.36 (1H, s), 7.30-7.49 (8H, m), 7.93 (1H, d), 8.05 (1H, d), 8.29 (1H, d)

Synthesis Example 4

A transition metal compound (1d) having the structure presented in the following Table 1 was prepared in the same manner as in Synthesis Example 1, except that 4-(3,5-di-tert-butylphenyl)-2-methyl-1H-indene was used, instead of 1-(2-methyl-1H-inden-4-yl)naphthalene, as a reactant in Synthesis Example 1.

$^1$H-NMR ($CDCl_3$, 500 MHz)
0.66 (4H, m), 0.94 (6H, t), 1.32 (18H, s) 1.79 (6H, s), 2.12 (3H, s), 6.36 (1H, s), 7.42-7.55 (5H, m), 7.73 (2H, s), 7.93 (1H, d), 8.05 (1H, d), 8.29 (1H, d)

Synthesis Example 5

A transition metal compound (1e) having the structure presented in the following Table 1 was prepared in the same manner as in Synthesis Example 1, except that 4-naphthyl-2-methyl-1,5,6,7-tetrahydro-s-indacene was used, instead of 1-(2-methyl-1H-inden-4-yl)naphthalene, as a reactant in Synthesis Example 1.

$^1$H-NMR ($CDCl_3$, 500 MHz)
0.21 (6H, s) 1.79 (6H, s), 1.94 (2H, q), 2.12 (3H, s) 2.85-2.90 (4H, m), 6.36 (1H, s), 7.30-7.52 (5H, m), 7.75 (1H, m), 7.93 (1H, d), 8.01-8.05 (2H, m), 8.20 (1H, d), 8.50 (1H, d), 8.95 (1H, d)

Synthesis Example 6

A transition metal compound (1f) having the structure presented in the following Table 1 was prepared in the same manner as in Synthesis Example 1, except that 4-phenyl-2-methyl-1,5,6,7-tetrahydro-s-indacene was used, instead of 1-(2-methyl-1H-inden-4-yl)naphthalene, as a reactant in Synthesis Example 1.

$^1$H-NMR ($CDCl_3$, 500 MHz)
0.23 (6H, s) 1.77 (6H, s), 1.98 (2H, q), 2.26 (3H, s) 2.97-3.02 (4H, m), 6.40 (1H, s), 7.32-7.52 (8H, m), 7.83 (1H, d), 8.05 (1H, m)

Synthesis Example 7

A transition metal compound (1g) having the structure presented in the following Table 1 was prepared in the same manner as in Synthesis Example 1, except that 4-(4-tert-butylphenyl)-2-methyl-1,5,6,7-tetrahydro-s-indacene was used, instead of 1-(2-methyl-1H-inden-4-yl)naphthalene, as a reactant in Synthesis Example 1.

$^1$H-NMR ($CDCl_3$, 500 MHz)
0.22 (6H, s), 1.33 (9H, s) 1.79 (6H, s), 1.95 (2H, q), 2.30 (3H, s) 2.97-3.02 (4H, m), 6.44 (1H, s), 7.38-7.48 (5H, m), 7.73 (1H, d), 8.01 (1H, d)

Synthesis Example 8

A transition metal compound (1 h) having the structure presented in the following Table 1 was prepared in the same manner as in Synthesis Example 1, except that 4-(3,5-ditert-butylphenyl)-2-methyl-1,5,6,7-tetrahydro-s-indacene was used, instead of 1-(2-methyl-1H-inden-4-yl)naphthalene, as a reactant in Synthesis Example 1.

$^1$H-NMR (CDCl$_3$, 500 MHz)

0.22 (6H, s), 1.33 (18H, s) 1.79 (6H, s), 1.95 (2H, q), 2.30 (3H, s) 2.97-3.02 (4H, m), 6.44 (1H, s), 7.38-7.48 (3H, m), 7.73 (1H, d), 7.95 (1H, d) 8.01 (1H, d)

Synthesis Example 9

A transition metal compound (1i) having the structure presented in the following Table 1 was prepared in the same manner as in Synthesis Example 1, except that 1,2-dimethyl-3H-benzo[b]cyclopenta[d]thiophene was used, instead of 1,2-dimethyl-3H-benzo[d]cyclopenta[b]thiophene in Synthesis Example 1.

$^1$H-NMR (CDCl$_3$, 500 MHz)

0.21 (6H, s), 1.79 (6H, s), 2.18 (6H, s), 6.95 (1H, s), 7.323-7.42 (6H, m), 7.73-7.79 (2H, m), 7.95 (1H, d), 8.10 (1H, d), 8.18 (1H, d), 8.25 (1H, d), 8.38 (1H, d), 8.59 (1H, d)

Synthesis Example 10

A transition metal compound (1j) having the structure presented in the following Table 1 was prepared in the same manner as in Synthesis Example 2, except that 1,2-dimethyl-3H-benzo[b]cyclopenta[d]thiophene was used, instead of 1,2-dimethyl-3H-benzo[d]cyclopenta[b]thiophene, as a reactant in Synthesis Example 2.

$^1$H-NMR (CDCl$_3$, 500 MHz)

0.24 (6H, s), 1.79 (6H, s), 2.20 (3H, s), 7.30-7.49 (9H, m), 7.79 (1H, d), 7.93 (1H, d), 8.10 (1H, d)

Synthesis Example 11

A transition metal compound (1 k) having the structure presented in the following Table 1 was prepared in the same manner as in Synthesis Example 3, except that 1,2-dimethyl-3H-benzo[b]cyclopenta[d]thiophene was used, instead of 1,2-dimethyl-3H-benzo[d]cyclopenta[b]thiophene, as a reactant in Synthesis Example 3.

$^1$H-NMR (CDCl$_3$, 500 MHz)

0.24 (6H, s), 1.40 (9H, s), 1.79 (6H, s), 2.12 (3H, s), 6.36 (1H, s), 7.30-7.51 (8H, m), 7.70 (1H, d), 7.90 (1H, d), 8.10 (1H, d)

Synthesis Example 12

A transition metal compound (1l) having the structure presented in the following Table 1 was prepared in the same manner as in Synthesis Example 4, except that 1,2-dimethyl-3H-benzo[b]cyclopenta[d]thiophene was used, instead of 1,2-dimethyl-3H-benzo[d]cyclopenta[b]thiophene, as a reactant in Synthesis Example 4.

$^1$H-NMR (CDCl$_3$, 500 MHz)

0.24 (6H, s), 1.35 (18H, s), 1.70 (6H, s), 2.17 (3H, s), 6.29 (1H, s), 7.30-7.43 (5H, m), 7.74 (1H, d), 7.80 (1H, d), 8.17 (1H, d)

Synthesis Example 13

A transition metal compound (1m) having the structure presented in the following Table 1 was prepared in the same manner as in Synthesis Example 5, except that 1,2-dimethyl-3H-benzo[b]cyclopenta[d]thiophene was used, instead of 1,2-dimethyl-3H-benzo[d]cyclopenta[b]thiophene, as a reactant in Synthesis Example 5.

$^1$H-NMR (CDCl$_3$, 500 MHz)

0.20 (6H, s), 1.74 (6H, s), 1.95 (2H, q), 2.18 (3H, s), 2.80 (4H, m), 6.37 (1H, s), 7.40-7.43 (5H, m), 7.70 (2H, m), 7.90 (1H, d), 7.99 (1H, d), 8.17 (1H, d), 8.45 (1H, d), 8.79 (1H, d)

Synthesis Example 14

A transition metal compound (1 n) having the structure presented in the following Table 1 was prepared in the same manner as in Synthesis Example 6, except that 1,2-dimethyl-3H-benzo[b]cyclopenta[d]thiophene was used, instead of 1,2-dimethyl-3H-benzo[d]cyclopenta[b]thiophene, as a reactant in Synthesis Example 6.

$^1$H-NMR (CDCl$_3$, 500 MHz)

0.25 (6H, s), 1.79 (6H, s), 1.89 (2H, q), 2.18 (3H, s), 2.80 (4H, m), 6.35 (1H, s), 7.39-7.43 (8H, m), 7.74 (1H, d), 7.93 (1H, d)

Synthesis Example 15

A transition metal compound (10) having the structure presented in the following Table 1 was prepared in the same manner as in Synthesis Example 7, except that 1,2-dimethyl-3H-benzo[b]cyclopenta[d]thiophene was used, instead of 1,2-dimethyl-3H-benzo[d]cyclopenta[b]thiophene, as a reactant in Synthesis Example 7.

$^1$H-NMR (CDCl$_3$, 500 MHz)

0.22 (6H, s), 1.33 (9H, s), 1.71 (6H, s), 1.95 (2H, q), 2.28 (3H, s), 2.85 (4H, m), 6.35 (1H, s), 7.30-7.43 (7H, m), 7.74 (1H, d), 7.90 (1H, d)

Synthesis Example 16

A transition metal compound (1p) having the structure presented in the following Table 1 was prepared in the same manner as in Synthesis Example 8, except that 1,2-dimethyl-3H-benzo[b]cyclopenta[d]thiophene was used, instead of 1,2-dimethyl-3H-benzo[d]cyclopenta[b]thiophene, as a reactant in Synthesis Example 8.

$^1$H-NMR (CDCl$_3$, 500 MHz)

0.23 (6H, s), 1.32 (18H, s), 1.75 (6H, s), 1.90 (2H, q), 2.28 (3H, s), 2.85 (4H, m), 6.35 (1H, s), 7.45-7.49 (3H, m), 7.74 (3H, m), 7.90 (1H, d)

TABLE 1

(1a)

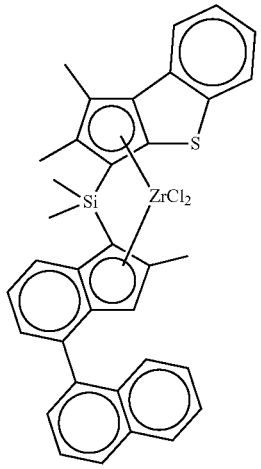

TABLE 1-continued
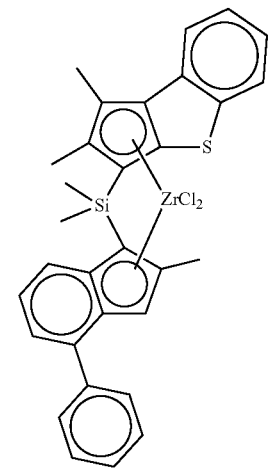
(1b)
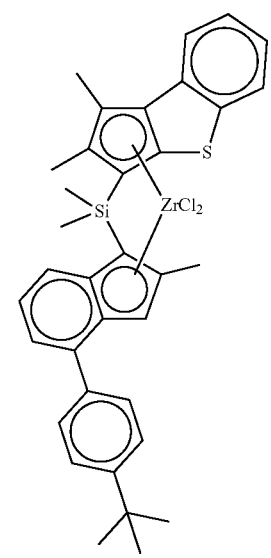
(1c)
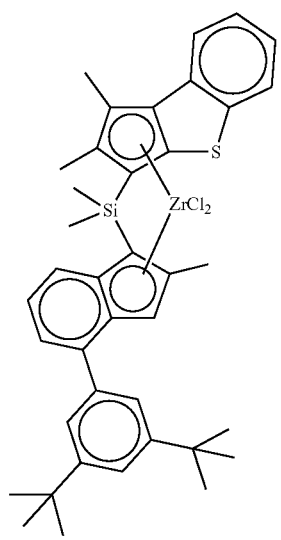
(1d)
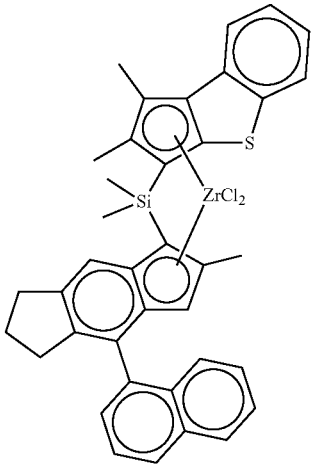
(1e)
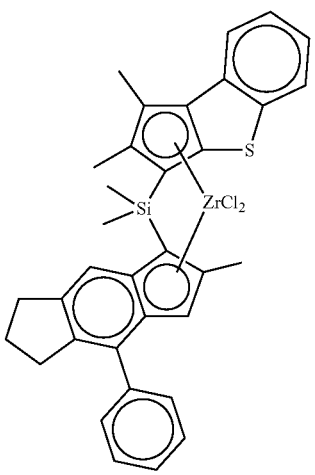
(1f)
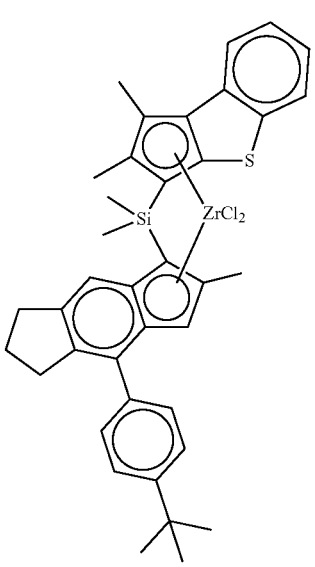
(1g)

TABLE 1-continued
(1h) 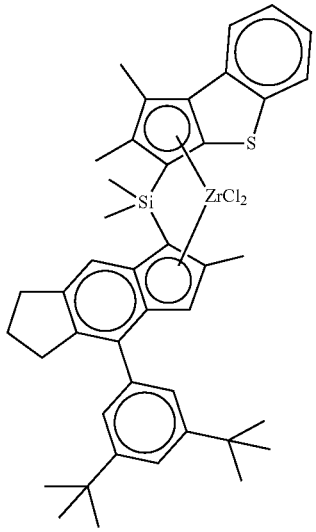
(1i) 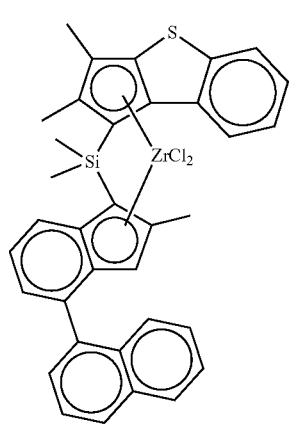
(1j) 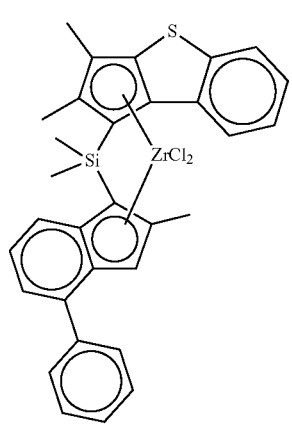
(1k) 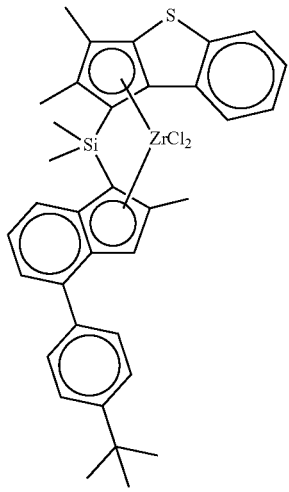
(1l) 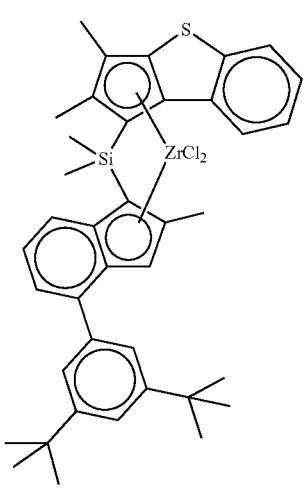
(1m) 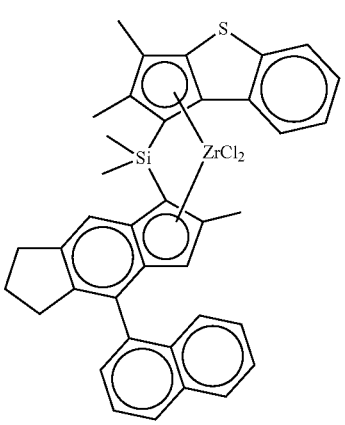

TABLE 1-continued

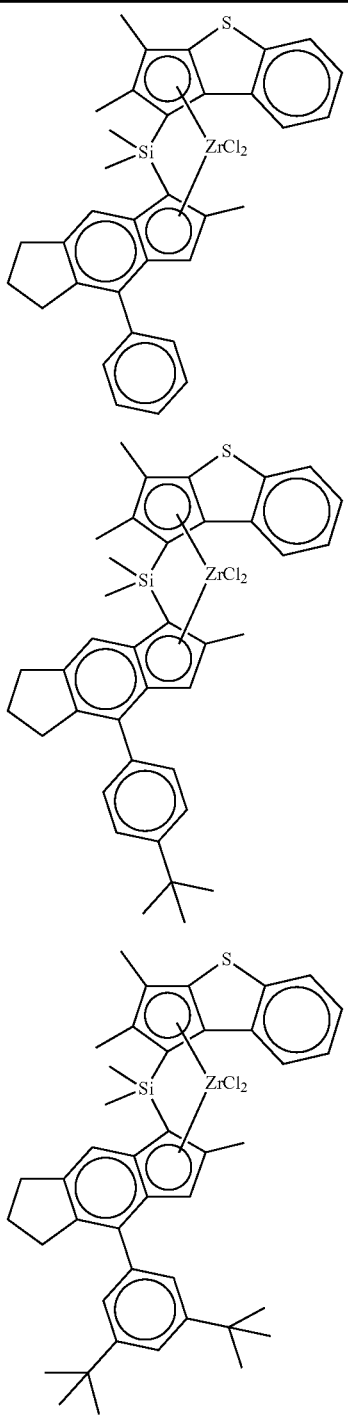

(1n)

(1o)

(1p)

<Preparation of Catalyst Composition>

Preparation Example 1

After weighing 3 g of silica (SP2410™, manufactured by Grace Davison) in a Schlenk flask in advance, 13 mmol of methylaluminoxane (MAO) was added thereto, and allowed to react at 95° C. for 24 hours. After precipitation, the upper layer was eliminated and the rest was washed twice with toluene. 70 μmol of the transition metal compound (1a) prepared in Synthesis Example 1 was dissolved in toluene, and allowed to react at 75° C. for 5 hours. After completion of the reaction, when the precipitation was completed, the upper layer solution was removed, and the remaining reaction product was washed with toluene, followed by washing with hexane.

After completion of washing, Atmer 163™ (manufactured by CRODA) dissolved in hexane was added to the resulting product and allowed to react, and dried under vacuum to obtain 5 g of a silica-supported catalyst composition in the form of solid particles.

Preparation Examples 2 to 16

Each catalyst composition was prepared in the same manner as in Preparation Example 1, except that each of the transition metal compounds (1b to 1p) prepared in Synthesis Examples 2 to 16 was used, instead of the transition metal compound (1a) in Preparation Example 1.

Comparative Preparation Example 1

A catalyst composition was prepared in the same manner as in Preparation Example 1, except that a transition metal compound (i) having the following structure was used, instead of the transition metal compound (1a) in Preparation Example 1.

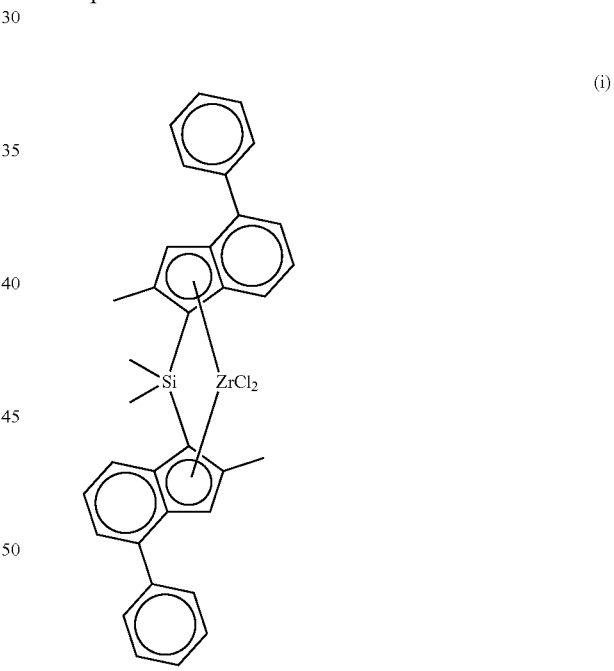

(i)

Comparative Preparation Example 2

A catalyst composition was prepared in the same manner as in Preparation Example 1, except that a transition metal compound (ii) having the following structure was used, instead of the transition metal compound (1a) in Preparation Example 1.

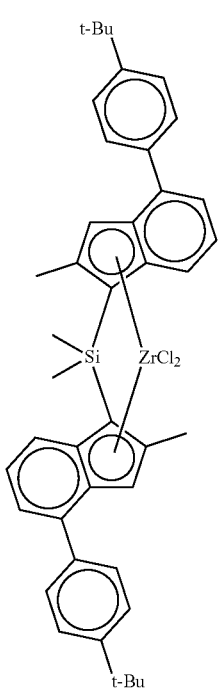

Comparative Preparation Example 3

A catalyst composition was prepared in the same manner as in Preparation Example 1, except that a transition metal compound (iii) having the following structure was used, instead of the transition metal compound (1a) in Preparation Example 1.

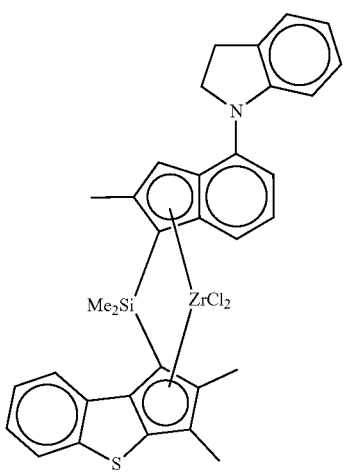

Comparative Preparation Example 4

A catalyst composition was prepared in the same manner as in Preparation Example 1, except that a transition metal compound (iv) having the following structure was used, instead of the transition metal compound (1a) in Preparation Example 1.

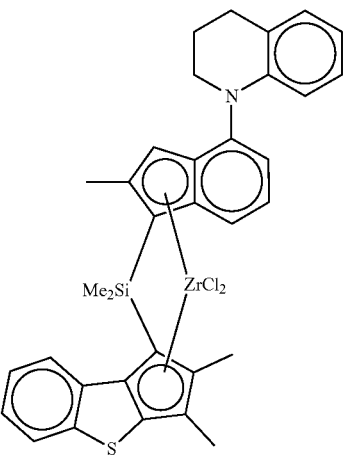

Comparative Preparation Example 5

A catalyst composition was prepared in the same manner as in Preparation Example 1, except that a transition metal compound (v) having the following structure was used, instead of the transition metal compound (1a) in Preparation Example 1.

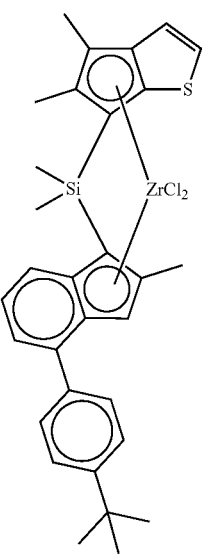

Comparative Preparation Example 6

A catalyst composition was prepared in the same manner as in Preparation Example 1, except that a transition metal compound (vi) having the following structure was used, instead of the transition metal compound (1a) in Preparation Example 1.

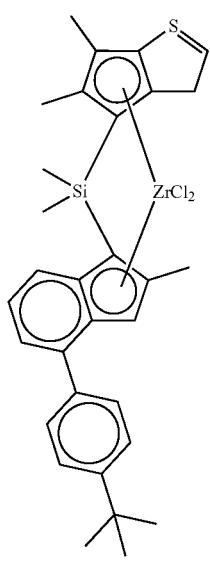

Comparative Preparation Example 7

A catalyst composition was prepared in the same manner as in Preparation Example 1, except that a transition metal compound (vii) having the following structure was used, instead of the transition metal compound (1a) in Preparation Example 1.

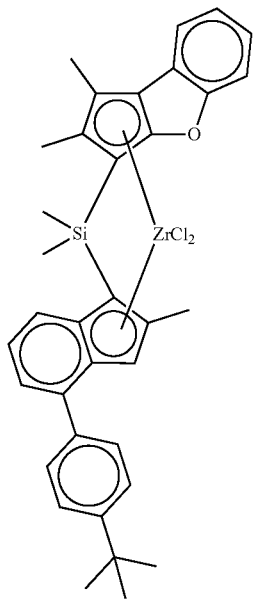

Comparative Preparation Example 8

A catalyst composition was prepared in the same manner as in Preparation Example 1, except that a transition metal compound (viii) having the following structure was used, instead of the transition metal compound (1a) in Preparation Example 1.

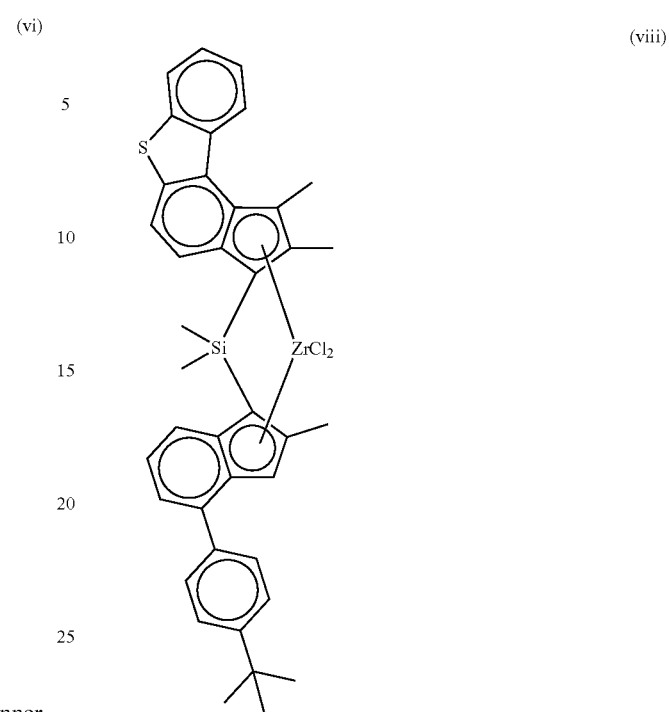

Comparative Preparation Example 9

A catalyst composition was prepared in the same manner as in Preparation Example 1, except that a transition metal compound (ix) having the following structure was used, instead of the transition metal compound (1a) in Preparation Example 1.

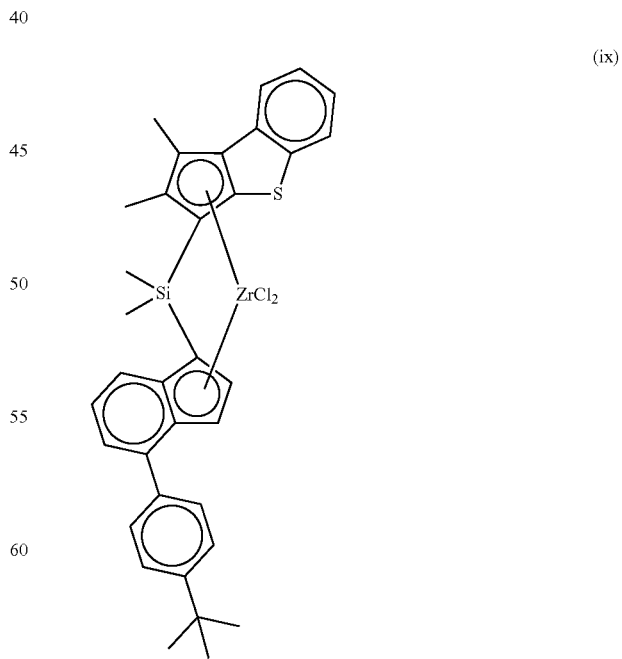

<Preparation of Homopolypropylene>

Example 1

A 2 L stainless reactor was dried under vacuum at 65° C., and then cooled, 1.5 mmol of triethylaluminum (in Hexane), 2 bar (corresponding to 331 ppm based on the total weight of propylene monomer) of hydrogen gas, and 770 g of propylene were sequentially introduced thereto. This mixture was stirred for 10 minutes, and then, the temperature was raised to 70° C. 35 mg of the catalyst composition prepared in Preparation Example 1 was dissolved in 20 mL of hexane, which was introduced into the reactor using nitrogen pressure. Polymerization was conducted for 1 hour. After completion of the reaction, unreacted propylene was vented.

Examples 2 to 16 and Comparative Examples 1 to 9

Each homopolypropylene was prepared in the same manner as in Example 1, except that each of the catalyst compositions prepared in Preparation Examples 2 to 16 or Comparative Preparation Examples 1 to 9 was used, instead of the catalyst composition prepared in Preparation Example 1, in Example 1.

Experimental Example 1

Activities of the catalyst compositions used in Examples and Comparative Examples and physical properties of the prepared homopolypropylenes were evaluated by the following methods. The results are shown in Table 2 below.

(1) Catalytic Activity (Activity, Kg PP/g Cat·Hr):

Activity was calculated as a ratio of the weight (kg PP) of the produced polymer per weight (g) of the catalyst composition used based on the unit time (h).

(2) Number Average Molecular Weight (Mn, g/Mol):

Mn was measured by gel permeation chromatography (GPC). Specifically, the measurement was performed using a Waters PL-GPC220 instrument using a PLgel MIX-B column of a 300-mm length from Polymer Laboratories, wherein an evaluation temperature was 160° C., 1,2,4-trichlorobenzene was used as a solvent, and a flow rate was 1 mL/min. A sample was prepared at a concentration of 10 mg/10 mL, and supplied in an amount of 200 μL. A calibration curve formed by using polystyrene standards was used to derive the Mn value. The molecular weight (g/mol) of the polystyrene standards was nine types of 2,000/10,000/30,000/70,000/200,000/700,000/2,000,000/4,000,000/10,000,000.

(3) Ratio of Vinyl End Groups (%) and Ratio of Vinylidene End Groups (%):

The number of the vinyl end groups per 1000 carbon atoms and the number of the vinyl end groups per 1000 carbon atoms in the polymer were obtained using $^1$H NMR, respectively. Specifically, the polymer was dissolved at a concentration of 2.5% by weight in a solvent $CDCl_3$, followed by $^1$H NMR analysis (500 MHz).

The results of $^1$H NMR analysis were used to calculate the ratio of vinyl end groups according to the following Equation 1 and the ratio of vinylidene end groups according to the following Equation 2.

$$\text{Ratio of vinyl end groups (\%)} = [(Mn/42) \times 2 \times ([Vi]/1000)] \times 100 \quad \text{[Equation 1]}$$

$$\text{Ratio of vinylidene end groups (\%)} = [(Mn/42) \times 2 \times ([Vd]/1000)] \times 100 \quad \text{[Equation 2]}$$

(in Equations 1 and 2, Mn is a value of the number average molecular weight (g/mol) of homopolypropylene, [Vi] is the number of the vinyl end groups per 1000 carbon atoms, and [Vd] is the number of the vinylidene end groups per 1000 carbon atoms)

TABLE 2

|  | Type of transition metal compound | Catalytic activity (kg PP/g cat · hr) | Mn (g/mol) | [Vi] | [Vd] | Ratio of vinyl end group (%) | Ratio of vinylidene end group (%) |
|---|---|---|---|---|---|---|---|
| Example 1 | 1a | 6.0 | 3,250 | 5.20 | 0.30 | 80.5 | 4.6 |
| Example 2 | 1b | 7.7 | 5,700 | 3.15 | 0.21 | 85.5 | 5.7 |
| Example 3 | 1c | 5.8 | 5,500 | 3.29 | 0.28 | 86.2 | 7.3 |
| Example 4 | 1d | 5.9 | 6,200 | 2.79 | 0.19 | 82.4 | 5.6 |
| Example 5 | 1e | 7.5 | 19,700 | 0.92 | 0.05 | 86.3 | 4.7 |
| Example 6 | 1f | 8.8 | 15,400 | 1.15 | 0.08 | 84.3 | 5.9 |
| Example 7 | 1g | 6.0 | 18,000 | 0.97 | 0.07 | 83.1 | 6.0 |
| Example 8 | 1h | 7.0 | 17,300 | 1.02 | 0.08 | 84.0 | 6.6 |
| Example 9 | 1i | 6.9 | 9,900 | 1.77 | 0.15 | 83.4 | 7.1 |
| Example 10 | 1j | 6.9 | 12,000 | 1.42 | 0.13 | 81.1 | 7.4 |
| Example 11 | 1k | 7.0 | 11,300 | 1.53 | 0.14 | 82.3 | 7.5 |
| Example 12 | 1l | 6.5 | 10,500 | 1.71 | 0.13 | 85.5 | 6.5 |
| Example 13 | 1m | 7.3 | 30,000 | 0.62 | 0.05 | 88.6 | 7.1 |
| Example 14 | 1n | 8.7 | 33,700 | 0.55 | 0.04 | 88.3 | 6.4 |
| Example 15 | 1o | 6.4 | 35,000 | 0.53 | 0.04 | 88.3 | 6.7 |
| Example 16 | 1p | 7.8 | 29,800 | 0.61 | 0.05 | 86.6 | 7.1 |
| Comparative Example 1 | i | 8.0 | 68,000 | N.D | 0.28 | 0 | 90.7 |
| Comparative Example 2 | ii | 8.9 | 55,000 | N.D | 0.25 | 0 | 65.5 |
| Comparative Example 3 | iii | <0.1 | N.D | N.D | N.D | N.D | N.D |
| Comparative Example 4 | iv | <0.1 | N.D | N.D | N.D | N.D | N.D |
| Comparative Example 5 | v | 4.9 | 7,200 | 1.81 | 0.98 | 62.1 | 33.6 |
| Comparative Example 6 | vi | 5.8 | 5,700 | 2.32 | 1.11 | 63.0 | 30.1 |

TABLE 2-continued

| | Type of transition metal compound | Catalytic activity (kg PP/g cat · hr) | Mn (g/mol) | [Vi] | [Vd] | Ratio of vinyl end group (%) | Ratio of vinylidene end group (%) |
|---|---|---|---|---|---|---|---|
| Comparative Example 7 | vii | 6.1 | 6,400 | 1.38 | 1.51 | 42.1 | 46.0 |
| Comparative Example 8 | viii | 5.8 | 22,000 | 0.20 | 0.69 | 21.0 | 72.3 |
| Comparative Example 9 | ix | 2.1 | 120 | 122.68 | 37.28 | 70.1 | 21.3 |

In Table 2, "0" means that the measurement is possible, but the measurement value is very low and thus its approximate value is 0, and "N.D" means that the corresponding item value is not measurable due to non-formation, etc.

As a result of the experiment, the homopolypropylenes of Examples 1 to 16 prepared using the transition metal compound represented by Chemical Formula 1 according to the present invention had the ratio of vinyl end groups of 80% or more and the ratio of vinylidene end groups of 8% or less, indicating that the ratio of vinyl end groups was remarkably high and the ratio of vinylidene end groups was remarkably low, as compared with the homopolypropylenes prepared in Comparative Examples 1 and 2 and Comparative Examples 5 to 9. These results suggest that the homopolypropylenes of Examples 1 to 16 may exhibit excellent melt strength characteristics.

Meanwhile, in Comparative Examples 3 and 4, the compound having the similar structure to the transition metal compound of Example 1, except that the substituent at position 4 in the ligand of the indene structure is a hetero ring containing a nitrogen atom, was used as the catalyst. However, due to the substituent difference, aromaticity was reduced, and catalytic activity was significantly decreased to less than 0.1, and no vinyl end groups were formed in the prepared homopolypropylene.

The above results indicate that the transition metal compound represented by Chemical Formula 1 is more effective in the production of macromonomers during polypropylene polymerization.

The invention claimed is:

1. A transition metal compound represented by Chemical Formula 1:

[Chemical Formula 1]

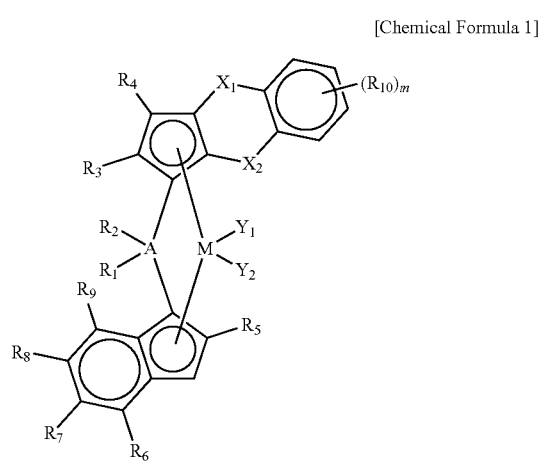

in Chemical Formula 1,

A is an element of Group 14;

M is a transition metal of Group 4, $R_1$ to $R_5$ are each independently linear $C_{1-6}$ alkyl, $R_6$ is $C_{6-20}$ aryl unsubstituted or substituted with linear or branched $C_{1-8}$ alkyl, $R_7$ to $R_9$ are each independently hydrogen, or two adjacent groups of $R_7$ to $R_9$ combine with each other to form a cyclopentyl group, $R_{10}$ is each independently hydrogen, one of $X_1$ or $X_2$ is S, and the other is a single bond, $Y_1$ and $Y_2$ are each independently halogen, and m is an integer of 4.

2. The transition metal compound of claim 1, wherein A is silicon and M is zirconium.

3. The transition metal compound of claim 1, wherein all of $R_1$ to $R_5$ are methyl.

4. The transition metal compound of claim 1, wherein $R_6$ is phenyl or naphthyl, each of which is unsubstituted or substituted with branched $C_{3-6}$ alkyl.

5. The transition metal compound of claim 1, wherein $R_6$ is phenyl, 4-t-butylphenyl, 3,5-di-t-butylphenyl, or naphthyl.

6. The transition metal compound of claim 1, wherein the transition metal compound is selected from the group consisting of compounds of the following structures:

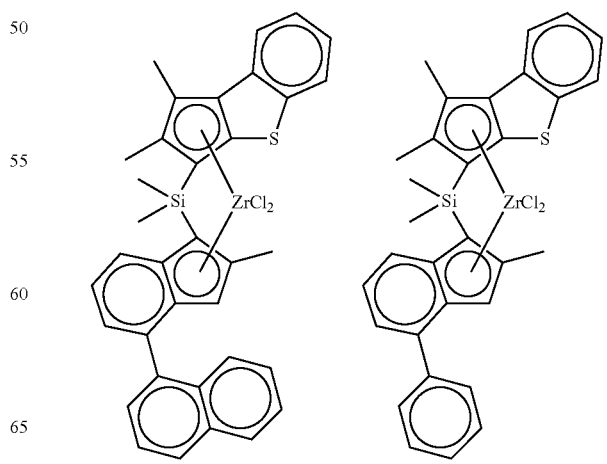

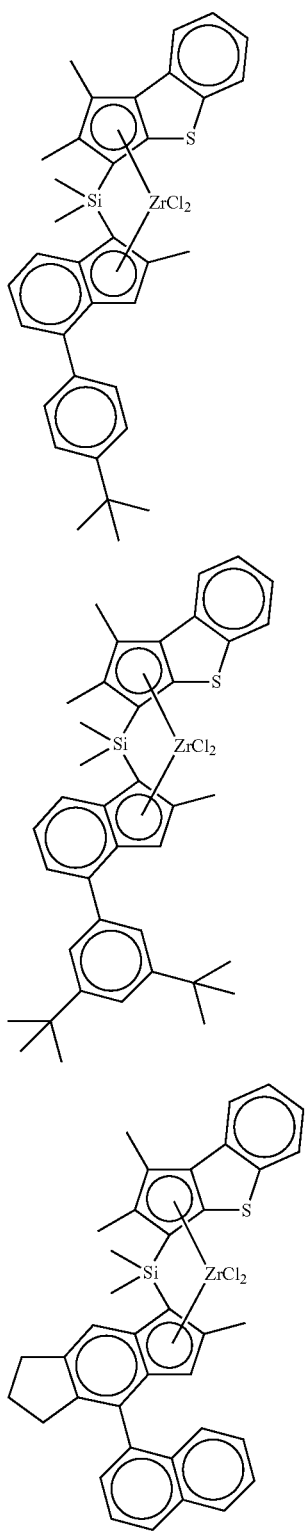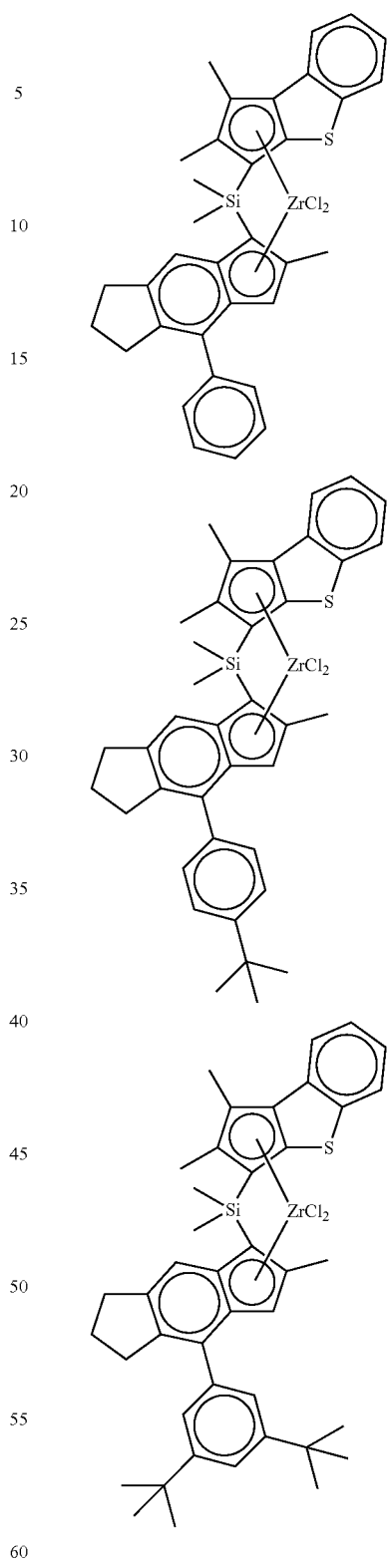

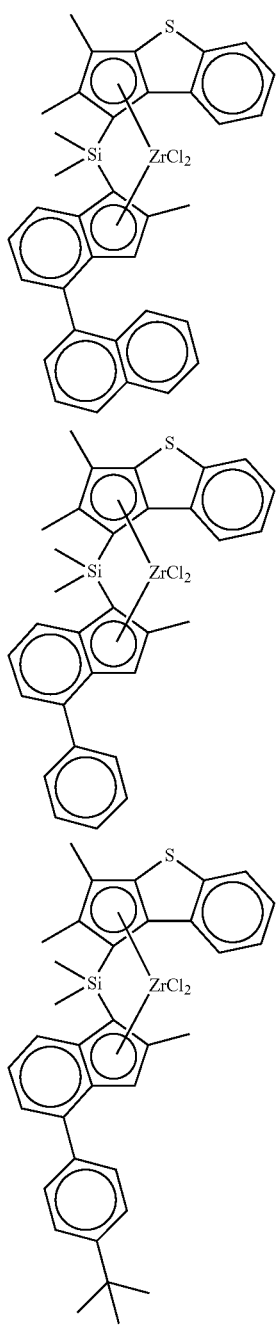
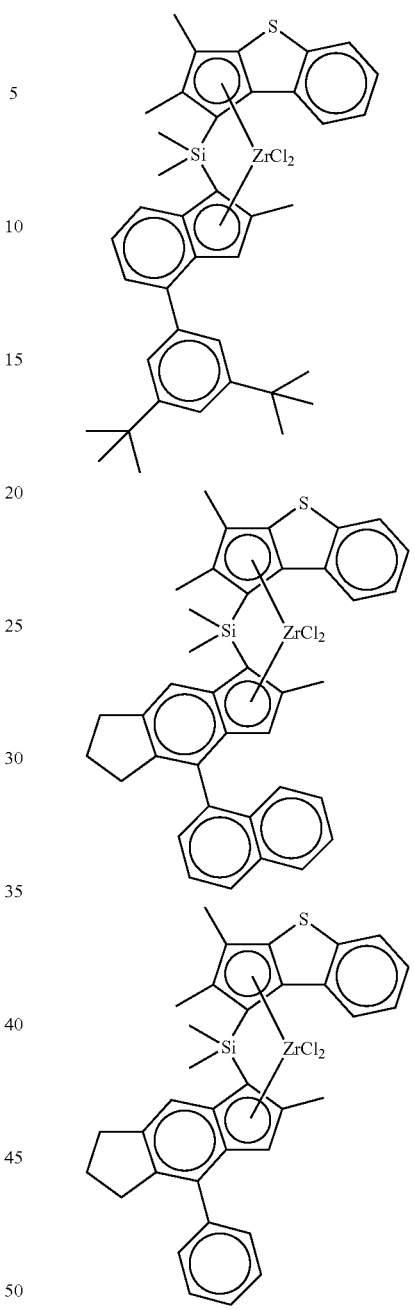

-continued

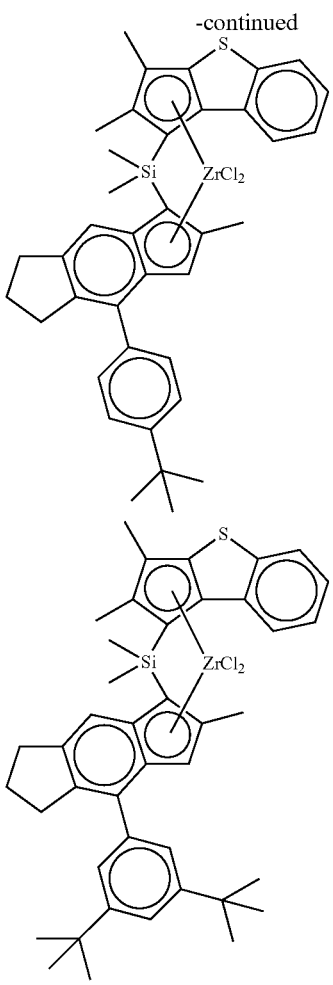

7. A catalyst composition comprising the transition metal compound of claim 1.

8. The catalyst composition of claim 7, further comprising at least one selected from a carrier, a cocatalyst, or an antistatic agent.

9. The catalyst composition of claim 8, wherein the carrier comprises silica.

10. The catalyst composition of claim 8, wherein the cocatalyst comprises one or more of compounds represented by the following Chemical Formulae 4 to 6:

$$-[Al(R_{11})-O]_m-$$ [Chemical Formula 4]

in Chemical Formula 4,
$R_{11}$ is the same as or different from each other, and is each independently halogen; $C_{1-20}$ hydrocarbon; or $C_{1-20}$ hydrocarbon substituted with halogen; and
m is an integer of 2 or more;

$$J(R_{12})_3$$ [Chemical Formula 5]

in Chemical Formula 5,
$R_{12}$ is the same as or different from each other, and is each independently halogen; $C_{1-20}$ hydrocarbon; or $C_{1-20}$ hydrocarbon substituted with halogen; and
J is aluminum or boron; and $$[E-H]^+[ZQ_4]^- \text{ or } [E]^+[ZQ_4]^-$$ [Chemical Formula 6]

in Chemical Formula 6,
E is a neutral or cationic Lewis base;
H is a hydrogen atom;
Z is an element of Group 13; and
Q is the same as or different from each other, and is each independently a $C_{6-20}$ aryl group or a $C_{1-20}$ alkyl group in which one or more hydrogen atoms are unsubstituted or substituted with halogen, $C_{1-20}$ hydrocarbon, alkoxy, or phenoxy.

11. The catalyst composition of claim 8, wherein the cocatalyst is alkylaluminoxane.

12. A method of preparing a homopolypropylene, which comprises polymerizing propylene monomers by adding hydrogen in the presence of the catalyst composition of claim 7.

13. The method of claim 12, wherein the hydrogen is added in an amount of 50 ppm to 2000 ppm, based on a total weight of the propylene monomers.

14. The method of claim 12, wherein the homopolypropylene has a ratio of vinyl end groups (:CH=CH$_2$) of 70% or more, as calculated according to Equation 1, and a ratio of vinylidene end groups (:C=CH$_2$) of 10% or less, as calculated according to Equation 2, $$\text{Ratio of vinyl end groups (\%)}=[(Mn/42)\times 2\times([Vi]/1000)]\times 100$$ [Equation 1]

$$\text{Ratio of vinylidene end groups (\%)}=[(Mn/42)\times 2\times([Vd]/1000)]\times 100$$ [Equation 2]

in Equations 1 and 2, Mn is a value of a number average molecular weight (g/mol) of homopolypropylene, [Vi] is a number of the vinyl end groups per 1000 carbon atoms, and [Vd] is a number of the vinylidene end groups per 1000 carbon atoms.

* * * * *